United States Patent
DeFrancia

(10) Patent No.: US 10,272,934 B2
(45) Date of Patent: Apr. 30, 2019

(54) MULTI-TERRAIN MULTI-PURPOSE INSULATED CONTAINER

(71) Applicant: Ice Rover, Inc., Boulder, CO (US)

(72) Inventor: Tomas A. DeFrancia, Boulder, CO (US)

(73) Assignee: Ice Rover, Inc., Boulder, CO (US)

( * ) Notice: Subject to any disclaimer, the term of this patent is extended or adjusted under 35 U.S.C. 154(b) by 0 days.

(21) Appl. No.: 15/625,092

(22) Filed: Jun. 16, 2017

(65) Prior Publication Data

US 2018/0015938 A1    Jan. 18, 2018

Related U.S. Application Data

(60) Provisional application No. 62/363,692, filed on Jul. 18, 2016.

(51) Int. Cl.
  B62B 1/12   (2006.01)
  B65D 43/16  (2006.01)
  (Continued)

(52) U.S. Cl.
  CPC .......... B62B 1/12 (2013.01); A45C 11/20 (2013.01); A45C 13/02 (2013.01); B62B 1/20 (2013.01); B62B 1/22 (2013.01); B62B 5/0079 (2013.01); B62B 5/066 (2013.01); B62B 5/067 (2013.01); B65D 25/04 (2013.01); B65D 25/28 (2013.01); B65D 43/163 (2013.01); B65D 43/22 (2013.01);
  (Continued)

(58) Field of Classification Search
  CPC ........... B62B 1/12; B62B 5/0079; B62B 1/22; B62B 1/20; B62B 5/067; B62B 5/066; B62B 2204/06; B62B 2202/52; A45C 13/02; A45C 11/20; A45C 2013/026; B65D 43/163; B65D 51/28; B65D 81/3813; B65D 25/28; B65D 25/04; B65D 43/22; F25D 3/08

See application file for complete search history.

(56) References Cited

U.S. PATENT DOCUMENTS

| | | | |
|---|---|---|---|
| 493,456 A * | 3/1893 | Violet ..................... | E05C 19/14 292/247 |
| 1,469,196 A * | 9/1923 | Strange ................... | E05C 19/14 292/246 |

(Continued)

OTHER PUBLICATIONS

Igloo, All Terrain Cooler, 100 quart, Jun. 2015.
(Continued)

*Primary Examiner* — Jacob B Meyer
(74) *Attorney, Agent, or Firm* — Lieberman & Brandsdorfer, LLC

(57) ABSTRACT

Embodiments relate to a multi-purpose insulated container. The container is comprised of a plurality of walls forming an enclosure. A lid is in communication with the body and is operable so as to enclose the container. A first wall is oppositely disposed from a second wall and the height of the first wall is greater than the height of the second wall. A base is provided and a third wall extends from the base to the second wall; the third wall having a gradient with respect to the base due to the height differential between the first wall and the second wall. A first wheel is positioned adjacent to the first side wall and a second wheel is positioned adjacent to the second side wall; the two wheels sharing an axis of rotation.

26 Claims, 16 Drawing Sheets

(51) Int. Cl.
*B65D 51/28* (2006.01)
*B65D 43/22* (2006.01)
*B65D 25/04* (2006.01)
*B65D 25/28* (2006.01)
*B65D 81/38* (2006.01)
*B62B 5/06* (2006.01)
*F25D 3/08* (2006.01)
*A45C 11/20* (2006.01)
*A45C 13/02* (2006.01)
*B62B 5/00* (2006.01)
*B62B 1/20* (2006.01)
*B62B 1/22* (2006.01)

(52) U.S. Cl.
CPC ......... *B65D 51/28* (2013.01); *B65D 81/3813* (2013.01); *F25D 3/08* (2013.01); *A45C 2013/026* (2013.01); *B62B 2202/52* (2013.01); *B62B 2204/06* (2013.01)

(56) References Cited

U.S. PATENT DOCUMENTS

| | | | |
|---|---|---|---|
| 3,591,194 A | 7/1971 | Vega | |
| 3,666,134 A * | 5/1972 | Rauch | E05B 65/006 174/50 |
| 4,035,009 A * | 7/1977 | Jacobs | B65F 1/1615 292/246 |
| 4,724,681 A | 2/1988 | Bartholomew et al. | |
| 4,759,560 A | 7/1988 | Virgulti | |
| 4,846,493 A * | 7/1989 | Mason | A45C 5/146 280/641 |
| 4,873,841 A * | 10/1989 | Bradshaw | A45C 5/14 62/239 |
| 4,873,847 A | 10/1989 | Bradshaw | |
| 4,932,677 A | 6/1990 | Shustack | |
| 4,976,448 A | 12/1990 | Wickersham | |
| 4,987,639 A * | 1/1991 | Baiuley | B65D 25/2858 16/222 |
| 5,044,513 A * | 9/1991 | Van Berne | A45C 13/28 220/318 |
| 5,193,706 A * | 3/1993 | Hanna | B25H 3/02 220/315 |
| 5,228,706 A * | 7/1993 | Boville | A45C 5/146 280/30 |
| D340,620 S | 10/1993 | Peters | |
| 5,249,438 A | 10/1993 | Rhaney et al. | |
| 5,269,157 A | 12/1993 | Ciminelli et al. | |
| 5,285,656 A * | 2/1994 | Peters | A45C 5/14 16/38 |
| 5,285,936 A * | 2/1994 | Matricardi, Jr. | B60R 9/045 224/328 |
| 5,306,029 A | 4/1994 | Kaiser, II | |
| 5,313,817 A * | 5/1994 | Meinders | A45C 5/146 62/457.1 |
| D353,304 S | 12/1994 | Friedrich | |
| 5,423,195 A * | 6/1995 | Peters | A45C 5/14 220/694 |
| 5,465,985 A | 11/1995 | Devan et al. | |
| 5,479,866 A | 1/1996 | Rae | |
| 5,484,046 A * | 1/1996 | Alper | A45C 5/146 190/115 |
| 5,490,606 A * | 2/1996 | Lombardo | B65F 1/004 220/324 |
| 5,595,429 A | 1/1997 | Kennedy | |
| 5,803,472 A | 9/1998 | Lien | |
| 5,953,931 A | 9/1999 | Brittain | |
| D415,658 S | 10/1999 | Frehse | |
| 5,988,658 A * | 11/1999 | Ritchie | A45C 13/385 280/47.17 |
| D429,606 S | 8/2000 | Israel et al. | |
| 6,153,857 A | 11/2000 | Gunnels | |
| 6,305,185 B1 * | 10/2001 | Sloan | A45C 5/14 62/235.1 |
| 6,311,991 B1 * | 11/2001 | Conrado | A45C 5/14 280/47.26 |
| 6,318,713 B1 | 11/2001 | Levi | |
| 6,318,740 B1 * | 11/2001 | Nappo | B62B 3/00 280/47.35 |
| 6,347,419 B1 * | 2/2002 | Kurtz | A47C 21/00 206/373 |
| 6,364,329 B1 * | 4/2002 | Holub | A45C 5/14 280/47.26 |
| 6,394,325 B1 | 5/2002 | Taylor | |
| 6,446,988 B1 | 9/2002 | Kho | |
| 6,474,097 B2 | 11/2002 | Treppedi et al. | |
| 6,497,424 B2 | 12/2002 | Gartner et al. | |
| 6,558,301 B1 * | 5/2003 | Jackson | A63B 21/0552 482/121 |
| D480,276 S | 10/2003 | Duart et al. | |
| 6,634,659 B2 * | 10/2003 | Sanskrit | B62B 1/24 206/217 |
| 6,895,778 B1 | 5/2005 | Ackerman | |
| 6,908,417 B2 * | 6/2005 | Jackson | A63B 21/0552 482/123 |
| D514,891 S | 2/2006 | Garcia et al. | |
| 7,140,507 B2 | 11/2006 | Maldonado et al. | |
| 7,155,859 B1 * | 1/2007 | Brooks | A01K 97/06 206/315.11 |
| 7,175,040 B2 * | 2/2007 | Lorenz | B65D 11/184 220/6 |
| 7,252,295 B2 | 8/2007 | Bludworth | |
| 7,284,763 B1 * | 10/2007 | King | A45C 13/02 190/18 A |
| 7,306,243 B2 * | 12/2007 | Van Horn | A45C 7/0022 280/30 |
| 7,334,802 B2 | 2/2008 | Kaplan | |
| 7,360,380 B2 * | 4/2008 | Van Handel | A45C 13/1084 211/9 |
| 7,588,156 B2 * | 9/2009 | Lorenz | B65D 11/184 220/6 |
| 7,601,101 B2 * | 10/2009 | Jackson | A63B 21/04 482/142 |
| D609,911 S | 2/2010 | Twig | |
| D613,560 S | 4/2010 | Robichaud et al. | |
| 7,714,708 B2 * | 5/2010 | Brackmann | B60P 3/14 180/290 |
| 7,717,440 B1 | 5/2010 | Baba | |
| 7,854,321 B2 * | 12/2010 | Twig | B25H 3/023 206/372 |
| 7,891,678 B2 | 2/2011 | Anderson et al. | |
| 7,909,148 B1 * | 3/2011 | Miller | A45C 9/00 190/11 |
| D649,783 S | 12/2011 | Brunner | |
| 8,256,242 B1 * | 9/2012 | Evans | A45C 13/262 62/457.7 |
| 9,132,598 B2 * | 9/2015 | Ernst | B30B 9/321 |
| 9,199,657 B2 | 12/2015 | Martin | |
| 9,199,782 B1 * | 12/2015 | Cliatt | B65D 81/3813 |
| 9,310,118 B2 * | 4/2016 | Zavitsanos | A45C 11/20 |
| D767,277 S | 9/2016 | Faibish | |
| D770,179 S | 11/2016 | Menirom | |
| D771,381 S | 11/2016 | Sosnovsky et al. | |
| 9,550,605 B1 | 1/2017 | Summers | |
| 9,700,110 B2 * | 7/2017 | Lee | A45C 5/146 |
| 9,835,367 B2 * | 12/2017 | Vanderberg | A45C 5/14 |
| D811,171 S * | 2/2018 | Golic | D7/605 |
| D815,919 S * | 4/2018 | DeFrancia | D7/605 |
| D815,921 S * | 4/2018 | Moffett, III | D7/605 |
| D816,423 S * | 5/2018 | DeFrancia | D7/605 |
| 10,022,856 B2 * | 7/2018 | Bensman | B25H 3/026 |
| 2002/0096844 A1 * | 7/2002 | Clegg | A45C 5/14 280/47.17 |
| 2003/0168371 A1 * | 9/2003 | Weimer | A45C 11/20 206/457 |
| 2004/0002411 A1 * | 1/2004 | Jackson | A63B 21/0552 482/121 |
| 2004/0238400 A1 * | 12/2004 | Knutsson | B65D 11/1833 206/600 |
| 2005/0232747 A1 * | 10/2005 | Brackmann | B60P 3/03 414/803 |

(56) References Cited

U.S. PATENT DOCUMENTS

| | | | |
|---|---|---|---|
| 2006/0052220 A1* | 3/2006 | Jackson | A63B 21/04 482/52 |
| 2006/0060580 A1* | 3/2006 | Lorenz | B65D 11/184 220/6 |
| 2006/0162403 A1* | 7/2006 | Handel | A45C 13/1084 70/63 |
| 2007/0001409 A1* | 1/2007 | Kaplan | A45C 9/00 280/35 |
| 2008/0156671 A1* | 7/2008 | Jansson | A45C 13/02 206/216 |
| 2008/0179847 A1* | 7/2008 | DeFrancia | B62B 1/18 280/47.26 |
| 2009/0127807 A1* | 5/2009 | Cornwell | B62B 3/006 280/28.5 |
| 2010/0000890 A1* | 1/2010 | Belden, Jr. | E05B 17/0062 206/307 |
| 2010/0000893 A1* | 1/2010 | Twig | B25H 3/023 206/373 |
| 2010/0275641 A1* | 11/2010 | Manner | A63B 63/08 62/457.1 |
| 2011/0197625 A1* | 8/2011 | Urban | B62B 5/067 62/457.1 |
| 2011/0226003 A1* | 9/2011 | Chaney | A45C 5/065 62/457.7 |
| 2012/0013091 A1* | 1/2012 | Giese | B62B 3/007 280/47.35 |
| 2012/0104013 A1* | 5/2012 | Cowie | B25H 3/02 220/831 |
| 2012/0292121 A1 | 11/2012 | Murray | |
| 2012/0292213 A1 | 11/2012 | Brunner | |
| 2013/0056478 A1 | 3/2013 | Canales, Jr. | |
| 2014/0197059 A1 | 7/2014 | Evans et al. | |
| 2015/0369529 A1* | 12/2015 | Monroe | F25D 3/08 62/457.2 |
| 2015/0375917 A1* | 12/2015 | Lee | B65D 81/3813 220/592.03 |
| 2016/0082891 A9* | 3/2016 | Parks | B60R 7/08 224/539 |
| 2016/0166070 A1* | 6/2016 | Golic | A45C 11/20 206/216 |
| 2017/0113856 A1* | 4/2017 | Hollis | E05F 1/16 |
| 2017/0129097 A1* | 5/2017 | Engvall | B25H 1/04 |
| 2017/0370629 A1* | 12/2017 | Fire | B67D 1/0084 |
| 2018/0015938 A1* | 1/2018 | DeFrancia | A45C 13/02 |
| 2018/0127007 A1* | 5/2018 | Kravchenko | F25D 3/06 |
| 2018/0141718 A1* | 5/2018 | Ahlstrom | A45F 3/46 |
| 2018/0141739 A1* | 5/2018 | Hengen | B65D 81/3813 |
| 2018/0274837 A1* | 9/2018 | Christensen | F25D 3/06 |
| 2018/0312294 A1* | 11/2018 | Wang | A47J 41/00 |

OTHER PUBLICATIONS

Pelican, ProGear 45-Quart Elite Wheeled Cooler, Oct. 2015.
Amazon, "RovR 80 Quart Wheeled Camping Cooler", First reviewed on Jan. 9, 2017. (http://www.amazon.com/RovR-Quart-Wheeled-Camping-Cooler/dp/B01M0SKHGH).

* cited by examiner

MULTI-TERRAIN MULTI-PURPOSE INSULATED CONTAINER

CROSS REFERENCE TO RELATED APPLICATION(S)

This application is a non-provisional patent application claiming the benefit of the filing date of U.S. Provisional Patent Application Ser. No. 62/363,692, filed Jul. 18, 2016, and titled "Multi-Terrain Multi-Purpose Insulated Container" which is hereby incorporated by reference.

FIELD OF THE INVENTION

The present embodiments relate to a container capable of traversing rough terrain and ergonomically incorporating a multitude of features. More specifically, the present embodiments relate to a portable container for use with a land vehicle, with the container configured with sufficient ground clearance, a junction for a tow bar, and accessory junctions to maximize the portability of the container and its functionality.

BACKGROUND

Portable containers, such as insulated chests, have been used for many years to transport food, liquids, ice, environmental samples, human tissues, or any potential items that need to remain heated or cooled during transportation. Some portable insulated containers are used on job sites for sample storage, in the medical industry for tissue transport and household uses including hauling food and beverages to picnics, beaches, and trips in a vehicle. Although quite common in everyday use, the modern insulated container has not evolved significantly in functionality since its first use. Insulated containers are typically constructed with a top opening accessible through a lid and are insulated on the walls, floor, and lid.

Current insulated container design is simple, but archaic and riddled with inconveniences. For example, an average sized insulated container can weigh over a hundred pounds when it is fully loaded. With this weight, the insulated container can be difficult to transport, even by more than one person. Many insulated containers are provided with relatively small wheels to help roll the container on paved surfaces without detracting from the storage space or adding to the size of the container's exterior. Smaller wheels, however, are insufficient for transporting containers in rougher, uneven terrain where wheels take more abuse and increased ground clearance is necessary. Solely increasing the size of the wheel is impractical as it either adds to the overall size of the container without additional storage space or, if integrated in the body of the container, subtracts from the available storage space within the container.

Insulated containers are commonly employed with outdoor activities, such as bicycling, camping, and going to the beach, etc. In these environments, the containers are generally transported by manually lifting or pulling a handle and rolling the container on the ground. Current container configurations are not properly designed for towing without damaging the exterior surface(s) of the container, and possibly dragging earthen matter and debris along with the container.

SUMMARY

The present embodiments relate to a portable container apparatus for transport of goods, the container configured with towing capabilities, and featuring modular characteristics of both a container and a wagon.

In one aspect, an apparatus is provided with a body comprising of a plurality of walls. The walls form an enclosure. A lid is in communication with the body and is operable so as to provide access to the enclosure. A first wall is oppositely disposed from a second wall and the height of the first wall is greater than the height of the second wall. A base and a third wall extending from the base to the second wall; the differential between the heights of the first wall and the second wall causing the third wall to have a gradient with respect to the base. A first wheel is positioned adjacent to the first side wall, a second wheel is positioned adjacent to the second side wall, and the two wheels share an axis of rotation.

In another aspect, a method of creating an apparatus is provided. A body is provided, formed of a plurality of walls, the walls forming an enclosure within the body. The walls comprise a first wall and a second wall wherein the height of the first wall is greater than that of the second wall. The walls also comprise a base and a third wall, wherein the third wall extends from the base to the second wall and has a gradient with respect to the base. A lid is installed in communication with the body and operable to provide access to the enclosure. A first wheel and a second wheel are affixed in rotatable communication with a first side wall and second side wall, respectively. The first wheel and the second wheel share an axis of rotation.

Other features and advantages of these embodiments will become apparent from the following detailed description of the presently preferred embodiments taken in conjunction with the accompanying drawings.

BRIEF DESCRIPTION OF THE DRAWINGS

The drawings referenced herein form a part of the specification. Features shown in the drawings are meant as illustrative of only some embodiments, and not of all embodiments unless otherwise explicitly indicated. Implications to the contrary are otherwise not to be made.

DETAILED DESCRIPTION

Prior art configurations of portable an insulated container, hereinafter referred to as a cooler, employs a substantially rectangular construction. However, this shape and configuration is not optimal for transport over rough terrain. Also, although some prior art coolers also have handles for carrying the cooler from one side or two oppositely disposed sides, their configuration does not support the application of a junction to accept a tow bar to be affixed to the body of the cooler. Moreover, the prior art may feature elements of portable containers that may provide the functionality of a cooler or of a wagon, however the prior art does not support the functionality of both a cooler and a wagon together. Accordingly, there is a need for a solution that functions to provide a cooler with portability over rough terrain, land vehicle towing capability, and the functional characteristics of both a cooler and a wagon combined.

It will be readily understood that the components of the present embodiments, as generally described and illustrated in the Figures herein, may be arranged and designed in a wide variety of different configurations. Thus, the following more detailed description of the embodiments of the apparatus, system, and method, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Figure 1:
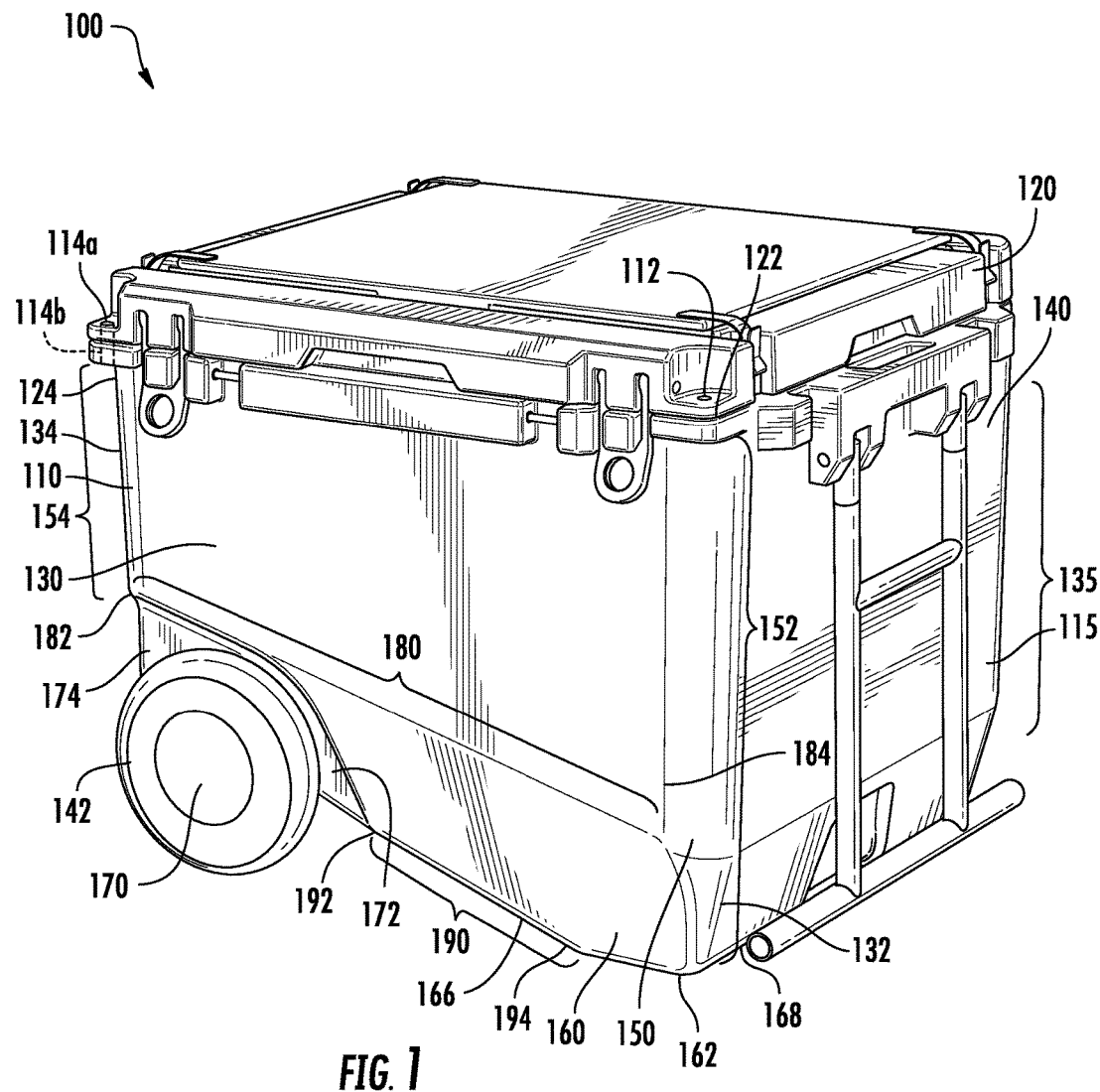
FIG. 1 depicts a first side view of the container.

A first side view of a portable cooler (100) is illustrated in FIG. 1. The container comprises a body (110) formed of a plurality of walls (130) and (140); the walls forming an enclosure within the body (110). Each wall (130) and (140) has an oppositely disposed wall (not shown), such that the container is relatively rectangular in shape. A lid (120) is provided in communication with the body (110) and is operable so as to provide a covered access to the cooler, and effectively convert the body (110) to an enclosed container. Goods, equipment, and other items may be stored within the enclosure. The walls (130) and (140), and the lid (120) may be insulated, and as such, convert the container into a cooler to store products that require or prefer insulation.

Wall (130) is referred to herein as a first side wall, and wall (140) is referred to as a front wall. The first side wall (130) and the front wall (140) meet at junction (150). In addition, the first side wall (130) and the front wall (140) each have a length that extends from the lid (120) to the base (160). As shown herein, junction (150) has a rounded exterior surface, referred to as a contour, although characteristics of the exterior surface should not be considered limiting. The length of the side wall (130) varies across the width of the side wall (130). To further demonstrate, the side wall (130) is shown with a proximal end (132) adjacently positioned to the front wall (140) via junction (150), and an oppositely disposed distal end (134). The proximal end (132) has a length (152) extending from a proximal end (122) of the lid (120) to a proximal end (162) of the base (160), and the distal end (134) has a length (154) extending from a distal end (124) of the lid (120). As shown in FIG. 1, length (152) adjacent to the proximal end of the container is greater than the length (154) adjacent to the distal end of the container. Accordingly, the shape of the container is not limited to properties of a rectangular solid.

A wheel (170) is shown positioned in a wheel well (172) adjacent to the distal end (134) of the side wall, with the wheel well positioned adjacent to the proximal end of the base (162). Two gradients are shown positioned in communication with the side wall (130), including a first gradient (180) and a second gradient (190). The first gradient (180) is shown at the proximal end relative to the wheel well (172). More specifically, the first gradient (180) has a proximal end (182) positioned along an exterior wall (174) of the wheel well (172), and a distal end (184) that is positioned adjacent to the junction (150). The second gradient (190) extends adjacent to the base (160). More specifically, the second gradient (190) includes a proximal end (192) where the base (160) and wheel well (170) meet, and a distal end (194). The first and second gradients (170) and (190), respectively, are relatively parallel. The distal end (194) of the second gradient (190) is positioned adjacent to a bottom wall (166) of the base (160). A second wheel (not shown) is positioned adjacent to a second side wall, oppositely disposed from the side wall (130), and an axle connects both wheels such that the two wheels share an axis of rotation. In another embodiment, the wheels are not connected by an axle and are therefore able to independently rotate with respect to one another. In a further embodiment, the axis of rotation of both wheels is substantially close to one or more of the walls and the radii of the wheels are large, i.e. at least two inches, thereby increasing the ground clearance of the container during transport.

As shown, the bottom wall (166) is parallel, or relatively parallel, to the lid (120) when the lid (120) is in a closed position, as shown herein. The lid (120) may be secured to the cooler body via a lock. As shown, a hole (114a) is positioned in the lid (120) and a corresponding hole (114b) is positioned in the cooler body. A lock (not shown) may extend through both holes and secured. When the lock is in a secured position, the lock prevents the lid (120) from being opened. Furthermore, the bottom wall (166) is shown with a foot (168) that communicates with the ground when the cooler is in a rest position. As further shown, when the cooler is in a rest position, the second gradient (190) does not communicate with the ground. Rather, communication with the ground is limited to the wheel (170) and the foot (168). The limited communication between the container and the ground both reduces the weight of the container and increases ground clearance of the container during transport.

Figure 2:
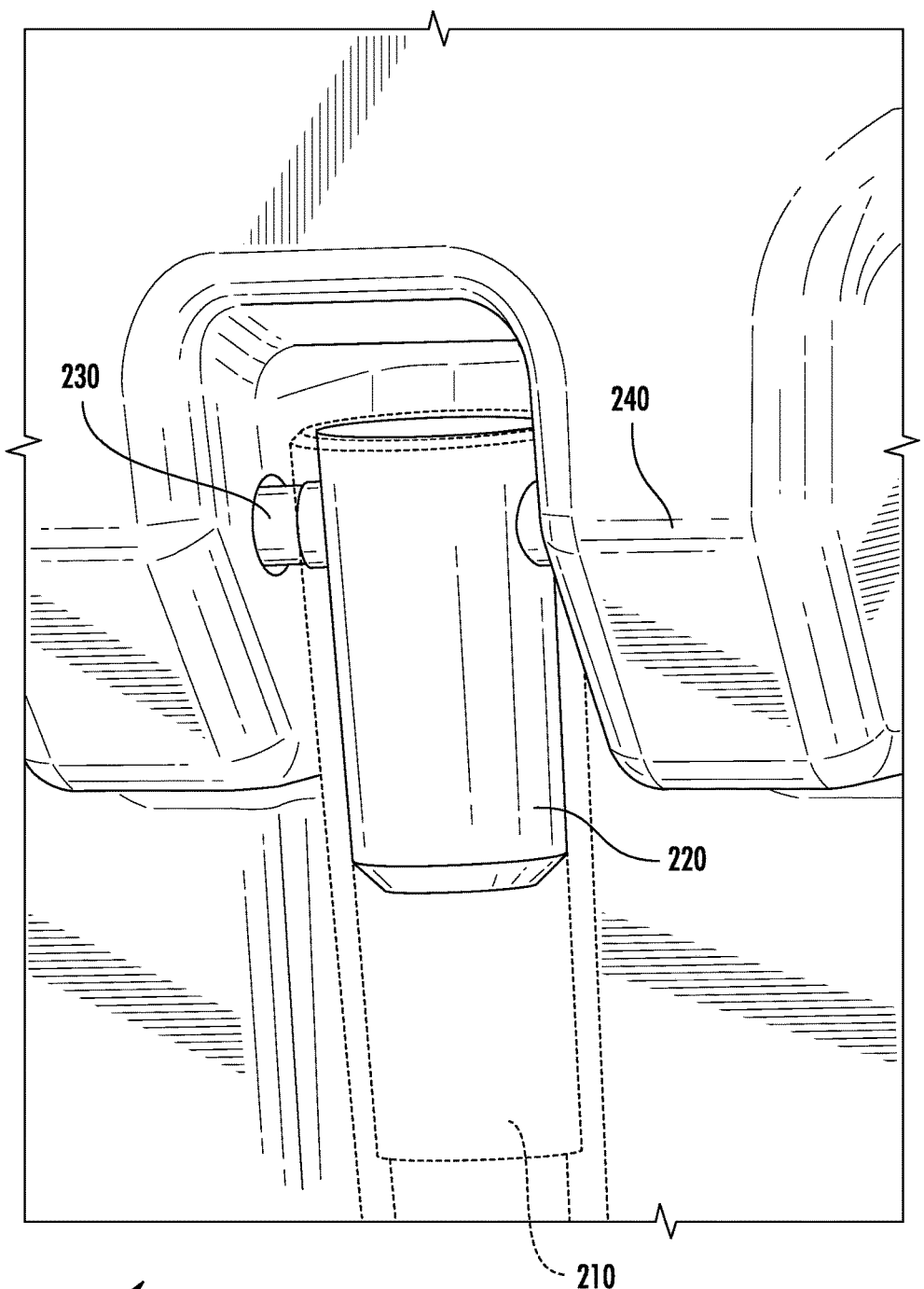
FIG. 2 depicts a front view of a handle illustrating attachment of the handle to the container body.

A handle (115) may be attached in a way and may have a length (135) such that when the user uses the handle (115), the container body (110) is lifted from the base (160) and rides with the third wall horizontal with respect to the ground. Referring to FIG. 2, a front view (200) of a handle illustrating attachment of the handle to the container body. As shown, the handle (210) may have an insert (220) in connection with the junction between the handle (210) and the pin (230) with which the handle (210) is axially connected. The pin (230) allows the handle to move in rotation with respect to the container body (240). The insert (220) is made of a friction material, such as rubber, silicon, or EPBM, so that axial movement between the handle (210) and the pin (230) is buffered. Buffering the axial movement of the handle (210) with respect to the pin (230) provides for the restriction of movement of the handle (210) to intentional movements by the user and absorbs the energy from unintentional movements such as swaying or rocking of the container body. By absorbing movement of the handle, an intentional movement is distinguished from an unintentional movement. Examples of the unintentional movement include, but are not limited to, dropping, swaying or rocking. The movement absorption of the handle (210) reduces impact of the handle (210) against the container body. However, the insert (220) does allow for the handle (210) to move when subject to a force, such as when the handle (210) is manually moved to a raised position. Accordingly, the insert (220) allows for the handle (210) to be positioned in a specific orientation with respect to the container body (240) while mitigating unintentional movement(s) from intentional movement(s).

Moreover, the handle may also comprise at least two gripping points positioned to leverage the weight associated with the goods and items within the enclosure. The gripping points would be used by the user in order to have a stronger grip on the cooler during manual transport. The handle may be provided in various configurations. One possible configuration for the handle may be in the shape provided in FIG. 1, whereby the handle (115) has a single gripping surface with multiple gripping points. Another possible configuration is provided in FIG. 11, whereby the handle (1120) has a 'FIG.8' configuration with a single gripping surface with multiple gripping points.

Figure 3:
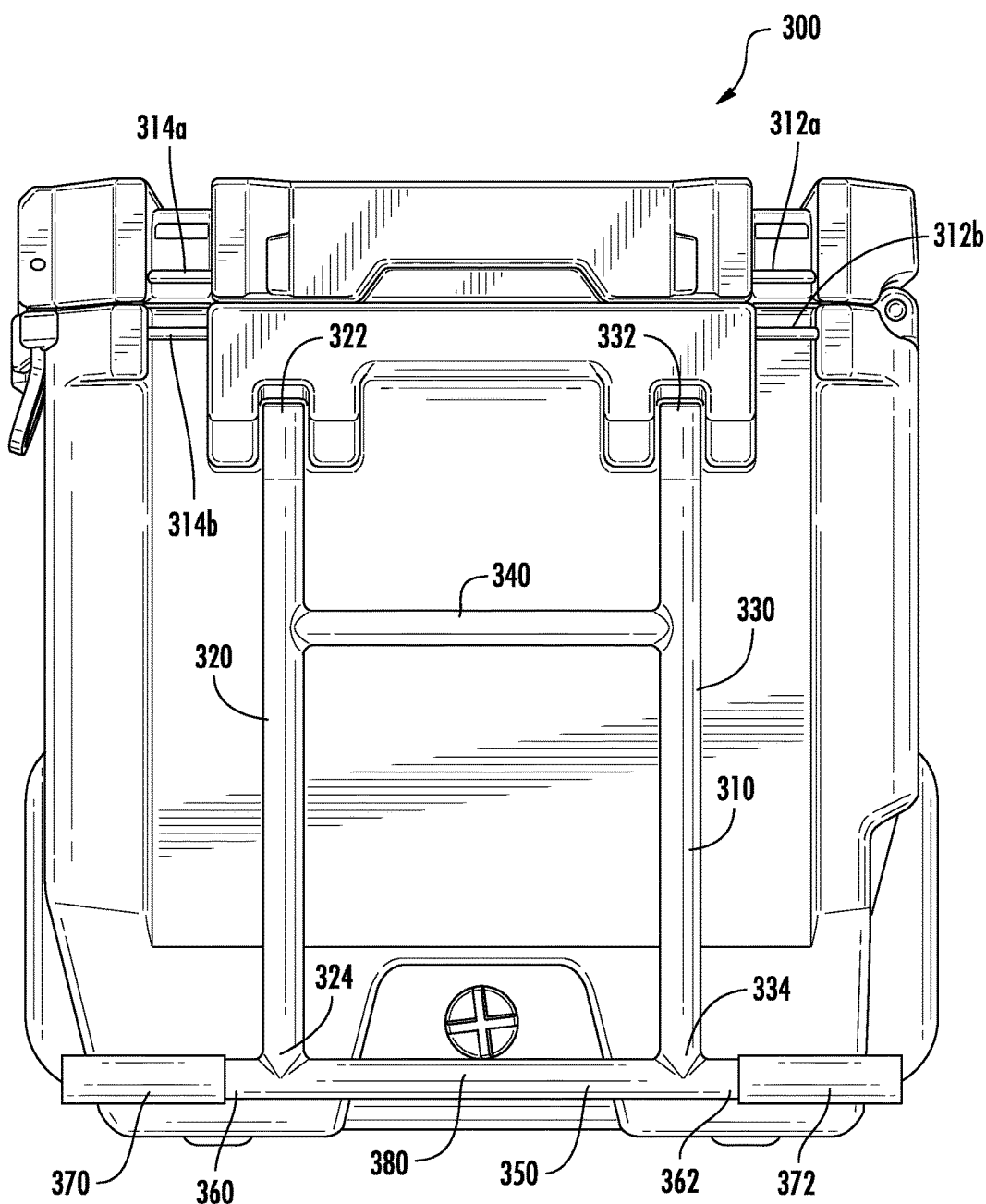
FIG. 3 depicts a front view of another possible configuration of the handle positioned proximal to the container.

Referring to FIG. 3, a diagram (300) is provided illustrating a front view of another possible configuration of the handle positioned proximal to the container. As shown, the handle (310) includes first and second legs (320) and (330) with a parallel or near parallel alignment. Each of the first and second legs is operatively coupled to the container, as shown in FIG. 2. More specifically, each of the first and second legs (320) and (330) is configured with a proximal end (322) and (332), respectively, and an oppositely positioned distal end (324) and (334), respectively. The proximal ends (322) and (332) are each operatively coupled to the container. A transverse leg (340) extends between the first and second legs (320) and (330) between the proximal and distal ends. The transverse leg (340) functions to align the first and second legs (320) and (330), respectively, and in one embodiment adds strength to the handle and mitigates warp. Similarly, in one embodiment, the transverse legs (340) may receive a secondary item (not shown). For example, in one embodiment, the transverse leg (340) may receive and hold a towel.

A handle bar (350) is positioned parallel or near parallel with the transverse leg (340). The handle bar (350) is operatively coupled to the distal ends (324) and (334) of the first and second legs (320) and (330), respectively. In addition, the handle (310) has two receivers (360) and (362), that extends coaxially with handle bar (350). Each receiver (360) and (362) functions as a gripping point, thereby providing multiple gripping points. As shown, each receiver (360) and (362) is configured with a cover (370) and (372), respectively, although this should not be considered a limiting embodiment. The covers (370) and (372) are provided to mitigate slip when the receivers are engage. In one embodiment, the covers (370) and (372) may be comprised of material such as, but not limited to, rubber, plastic, silicon, or EPBM, foam, or PVC. Similarly, in one embodiment, an area (380) of the handle bar (350) positioned between the first and second legs (320) and (330), respectively, may be employed as a gripping point or a gripping surface. In one embodiment, the area (380) may be provided with a cover (not shown) to mitigate slip when the area (380) is engaged. Accordingly, the handle may be configured with multiple gripping points and gripping surfaces.

As further shown in FIG. 3, a plurality of pins is positioned adjacent to select exterior areas of the cooler. The pins may be employed to extend the functionality of the cooler, as shown and described in FIG. 8. In addition, the pins may be employed to secure or lock the lid to the cooler. As shown in this view, the lid has two pins (312a) and (314a), and the body has two pins (312b) and (314b). A corresponding gap is provided adjacent to each pin. Namely, a gap is formed between each of pins (312a) and (314a) and the lid, and another gap is formed between each of pins (312b) and (314b) and the body. When the lid is in a closed position, pin (314a) is aligned with pin (314b) and pin (312a) is aligned with pin (312b). A lock (not shown) may be employed to secure the lid to the cooler body via one or more sets of the aligned pins. For example, a lock may be employed to extend through pins (314a) and (314b), and/or a lock may be employed to extend through pins (312a) and (312b). In one embodiment, the lock may prevent theft and/or tampering with any goods or products stored within the cooler body.

Figure 4:
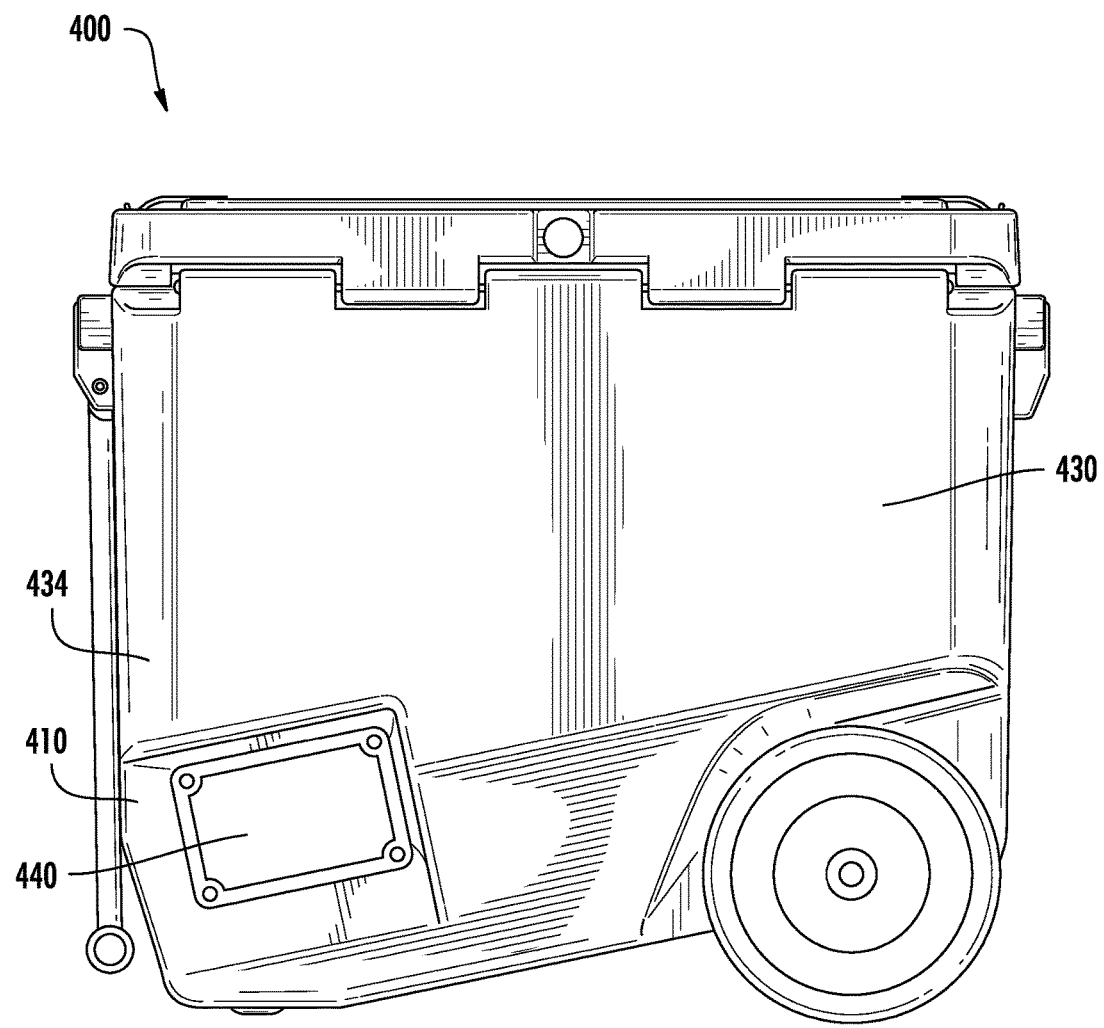
FIG. 4 depicts a second side view of the container.

Referring to FIG. 4, a second side view (400) of the container is shown, with the second side positioned opposite from the first side. More specifically, the second side view (400) is shown with the same properties as the first side, shown and described in FIG. 1, including the first and second gradients, and the wheel well. In addition, the second side view shows a contour (410) formed within the wall (430) and positioned adjacent to the distal end (434). A cover (440) is positioned in the contour (410). The cover (440) may be replaced with a second cover, as shown in FIG. 5, with the second cover designed to receive and hold a tow bar in communication with the container.

Figure 5:
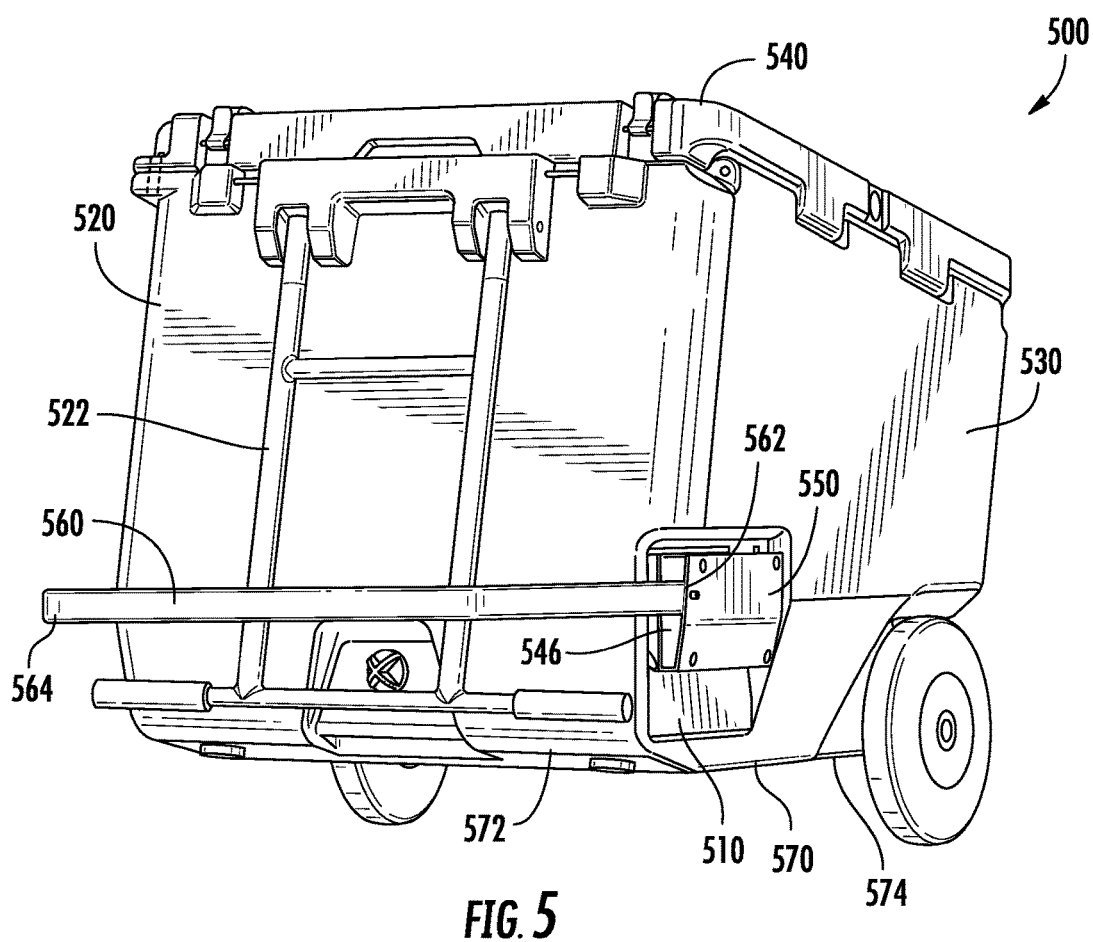
FIG. 5 depicts a perspective view of the container showing the tow bar bracket.

As shown in FIG. 5, is a perspective view (500) of the container is provided showing the tow bar bracket. More specifically, the container is shown with a front wall (520) and a side wall (530), both in communication with the lid (540). The front wall (520) is shown with a handle (522) in a lowered position. In one embodiment, the handle (522) may be rotated into a raised position to manually pull the container.

The side wall (530) is shown with the cover (440) having been replaced with bracket (550), also referred to herein as a tow bracket. The bracket (550) is shown fixed within the side wall contour (510) and fastened to the side wall (530). More specifically, the bracket (550) is shown within an opening (546) configured to receive a tow bar (560). As shown, a proximal end (562) of the tow bar (560) is fixed to the bracket (550), and a distal end (564) is oppositely positioned. In one embodiment, the distal end (564) may be fixed to a land vehicle (not shown), including but not limited to a bicycle, an all-terrain vehicle, an automobile, etc. The distal end (564) of the tow bar (560) is shown in communication with the ground when the container is in a rest position, with a proximal end (572) of the base (570) also in communication with the ground when the container is in a rest position. Accordingly, by replacing the cover (440) with the tow bracket (550), the container may be pulled by a land vehicle. Also, the bracket (550) may be positioned in an orientation such that when the tow bar (560) is installed and a vehicle is used to tow the container, the base (570) is lifted off the ground and the third wall (574) orientated horizontal with respect to the ground. This orientation may be parallel to the third wall (570) or otherwise, depending on the configuration of the tow bar (560).

Figure 6:
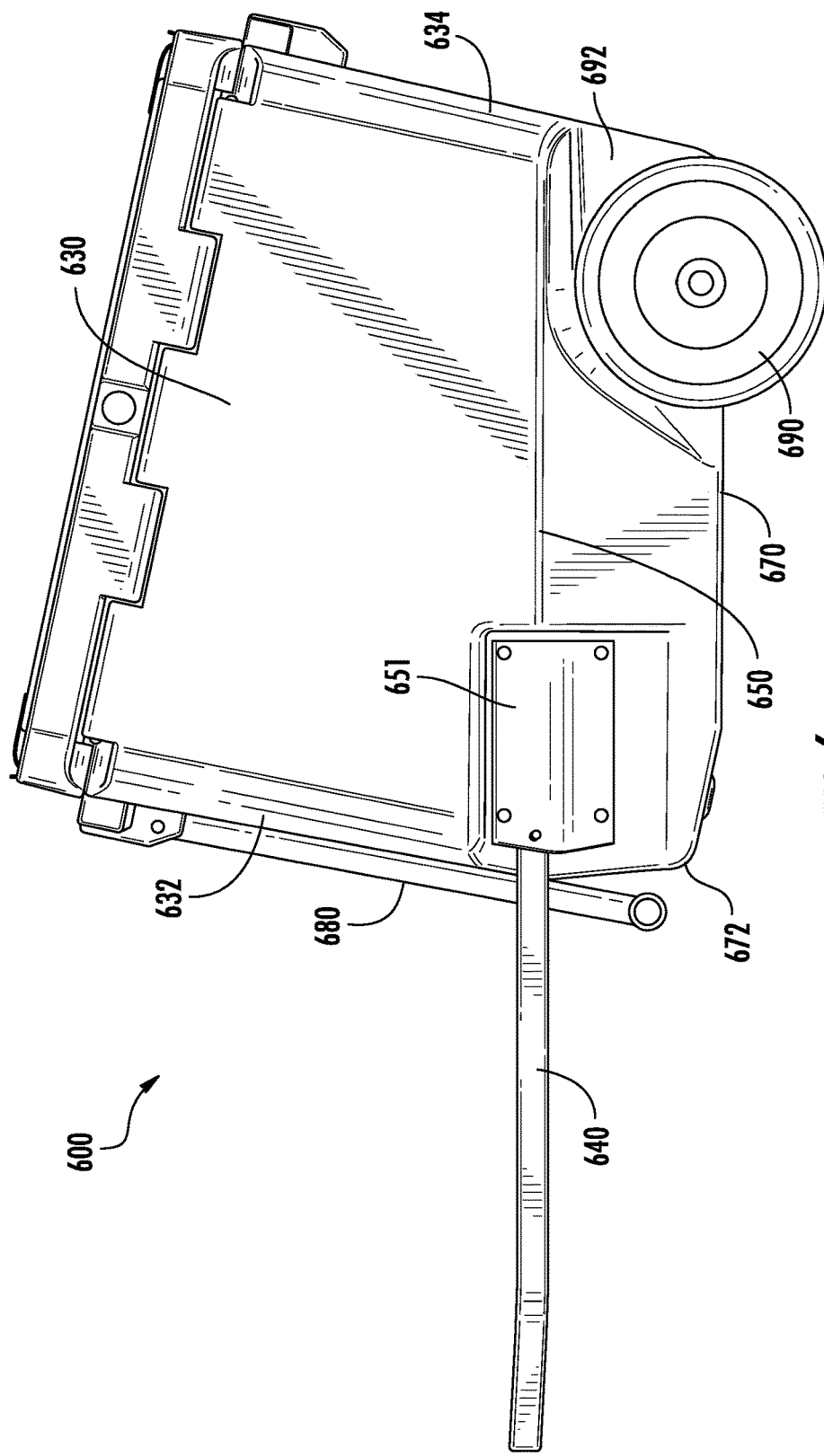
FIG. 6 depicts a side view of the container with the tow bar in a raised position.

Referring to FIG. 6, a side view (600) of the container is shown with the tow bar in a raised position. A side wall (630) of the container is shown, with a proximal end (632) and a distal end (634), and a gradient (650) extending from the proximal end (632) to the distal end (634). As further shown, a wheel (690) is positioned in wheel well (692) adjacent to the distal end (634). A tow bar (640) is shown fixed adjacent to the side wall (630) and adjacent to the proximal end (632) by tow bracket (651). Details of the tow bracket (651) are shown and described in FIG. 5. The tow bar (640) is shown in a raised position, with the tow bar (640) aligned or co-planar to the gradient (650). In one embodiment, and as shown here, when the cooler is in the raised position, the tow bar (640) is aligned with the gradient (650), and both the tow bar (640) and the gradient (650) are relatively parallel to the ground. In addition, the proximal end (672) of the base (670) is shown in a raised position, so that the proximal end (672) is not in communication with the ground. In an alternative embodiment, the container may be placed in a raised position through the handle (680), with the raised position having similar characteristics to the raised position shown through the tow bar (640).

As shown in FIGS. 1-6, the container has a limited bottom wall. More specifically, there are two sections to the bottom wall, with a first section having a gradient relatively parallel to the gradient of the side wall, and a second section that is planar and relatively parallel to the lid. When the container is in a rest position, only the second section of the bottom wall is in communication with the ground. The bifurcation of the bottom wall reduces weight associated with the container, which in one embodiment enhances the transportability of the container.

Figure 7:
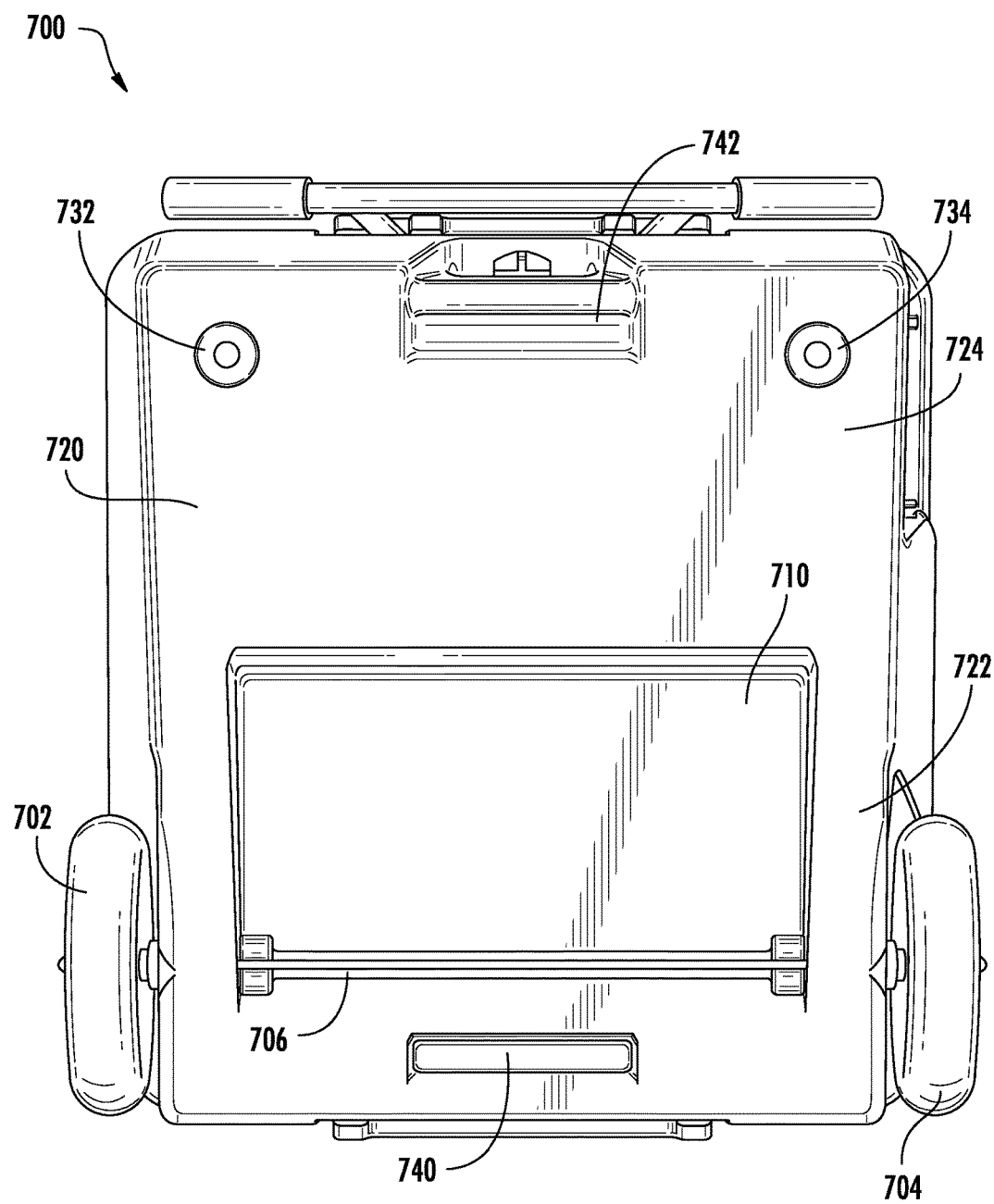
FIG. 7 depicts a bottom view of the container.

Referring to FIG. 7, a bottom view (700) of the container is provided. As shown, the bottom view illustrates components of the container that may not otherwise be visible, but at the same time add to the functionality of the container. A set of wheels (702) and (704) are shown in communication across an axle (706). A pocket (710) is shown positioned adjacent to the axle (706) and within a first section (722) of the bottom wall (720). The pocket (710) is a cutout within the first section (722) and functions to reduce the weight of the container. A pair of feet (732) and (734) is shown positioned within a second section (724) of the bottom wall (720). The feet (732) and (734) are positioned along an area of the bottom wall (720) that communicates with the ground when the container is in a rest position. More specifically, contact with the ground is through the feet (732) and (734). In one embodiment, the feet are comprised of a rubber material. The feet allow the base of the container to catch with the ground, and effectively prevent the container from sliding on the ground. In one embodiment, the feet provide friction between the ground and the container. Accordingly, the feet contribute to the frictional engagement of the container with the ground.

It has been discussed how the container may be raised off the ground via the handle or tow bar and transported via rotation of the wheels. In one embodiment, the container may be carried instead of being pushed or pulled on the ground. Two handles (740) and (742) are shown positioned within the bottom wall (720). More specifically, a first handle (740) is positioned within the first section (722), and a second handle (742) is positioned within the second section (724). The first and second handles (740) and (742), respectively, are effectively pockets positioned on opposite ends of the bottom wall (720). The handles are sized to receive fingers to enable a grip of the container from the bottom wall, so that the container can effectively be lifted off the ground in a controlled manner. Accordingly, in addition to transporting the container along the ground, the container may be lifted vertically off the ground by placing a grip in the handles (740) and (742).

Figure 8:
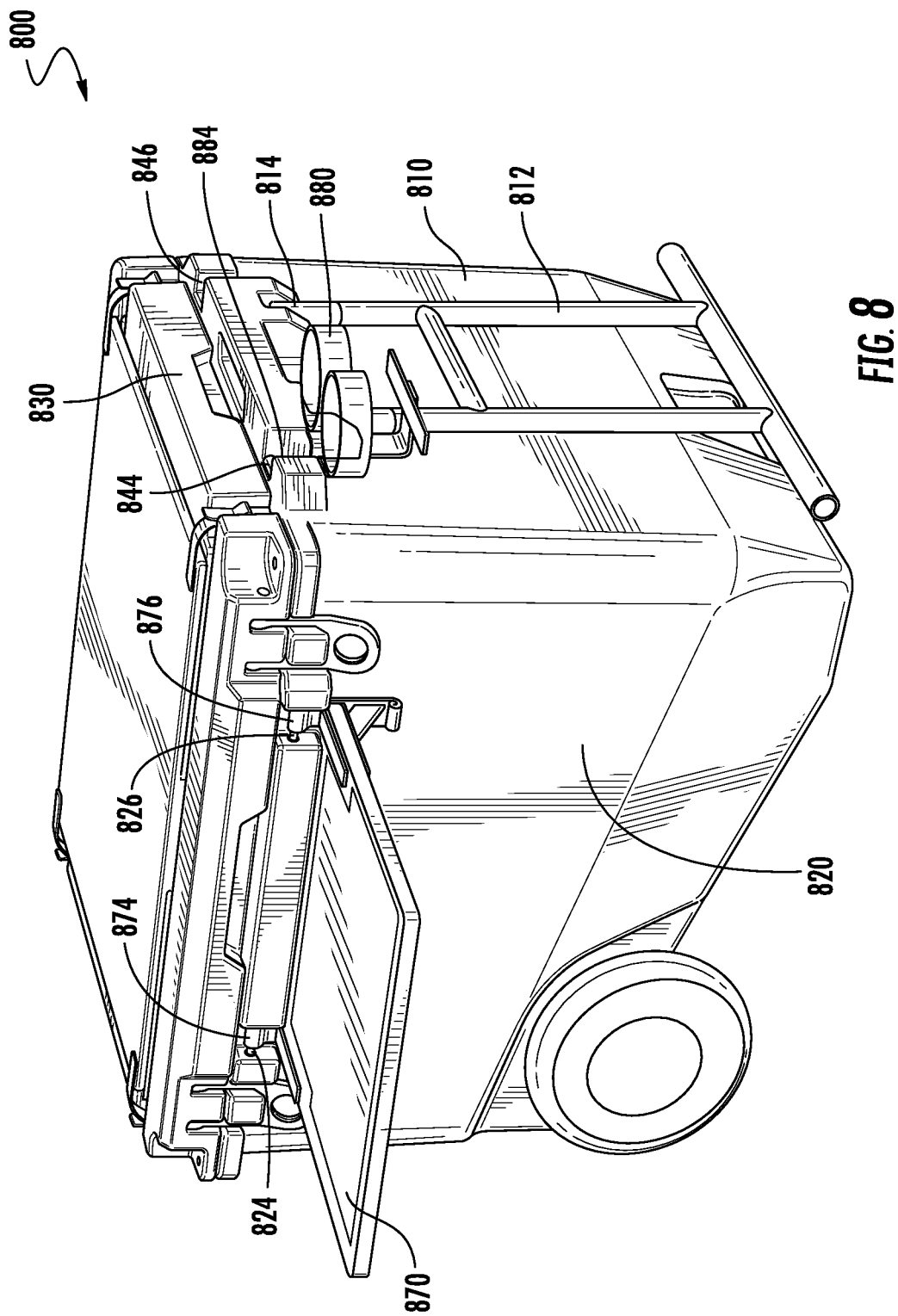
FIG. 8 depicts a perspective view of the container in a stationary position.

FIGS. 1-7 illustrate details of the container that enable transport of the container. The container is used to transport product between locations. In one embodiment, the container is insulated and used as a cooler to transport food for an excursion, such as a camping trip. When the container is in a stationary position, and the feet are in communication with the ground, one or more accessories may be placed in communication with the container. Referring to FIG. 8, a perspective view (800) of the container in a stationary position is provided showing the front and side walls (810) and (820), respectively, and the lid (830). The front wall (810) is shown with a handle (812) in a lowered position. The handle is shown fixed to the front wall (810) at (814). A pair of pins (844) and (846) is shown positioned on either side of the handle (812). In one embodiment, the pins are comprised of an Aluminum material. Each pin is configured to receive an accessory or an attachment. In this example, an accessory in the form of a cup holder (880) is shown in communication with one of the pins (844). More specifically, the cup holder (880) is shown with a handle (884) wrapped over pin (844). The wrapping of the handle (884) effectively anchors the cup holder (880) to the container. Another accessory in the form of a secondary tray (870) is shown attached to the side wall (820) via pins (824) and (826). The tray (870) is shown with two handles (874) and (876), each configured to be wrapped over the associated pin. More specifically, handle (874) is shown wrapped over pin (824) and handle (876) is shown wrapped over pin (826). The wrapping of the handles over the respective pins anchors the tray (870) to the container. one embodiment, one or more of the pins (844), (846), (824), and (826) may receive a carabiner (not shown) to attach or secure a secondary accessory to the container. Accordingly, by securing accessories to the container, the functionality of the container may be expanded.

Figure 9:
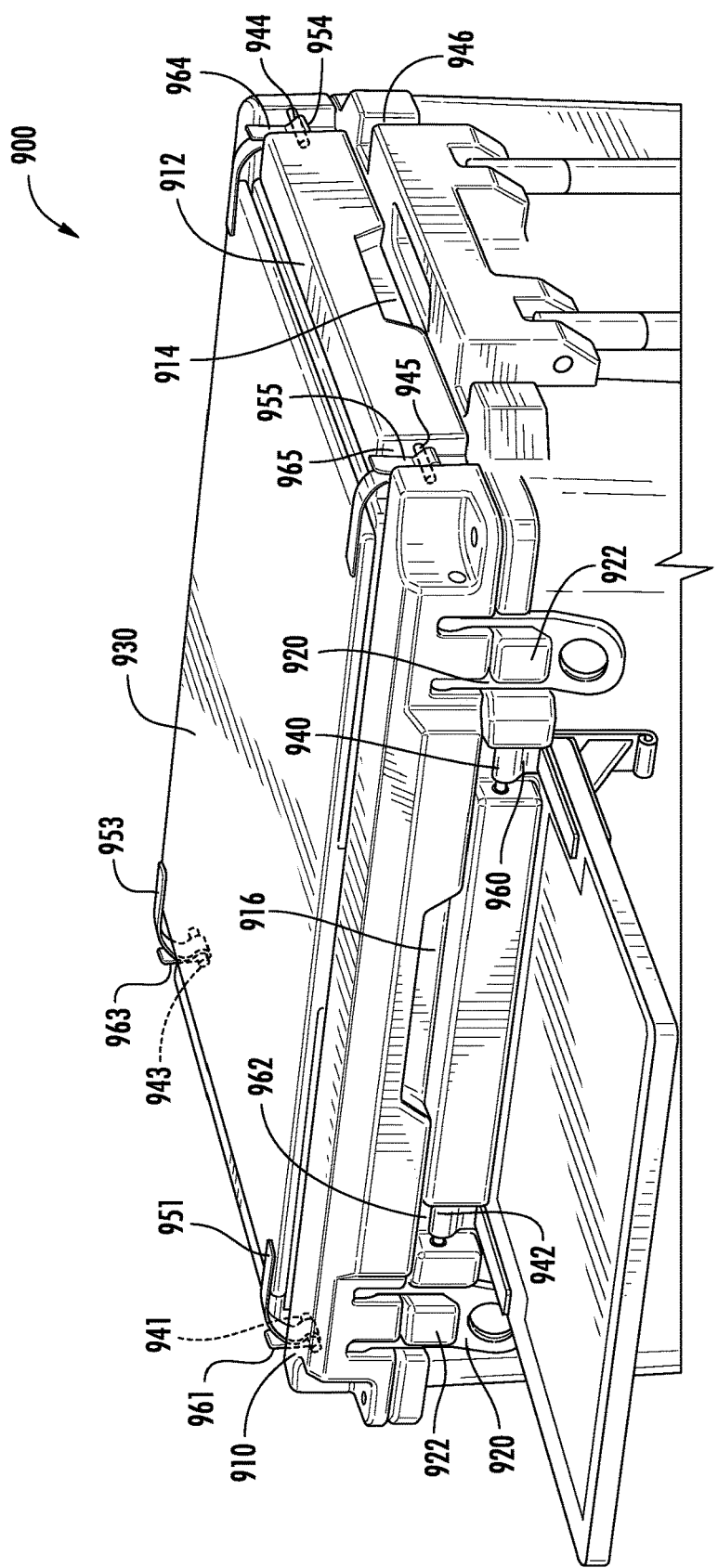
FIG. 9 depicts a perspective view of the container illustrating the lid and expansion capability of the lid through an integrated bin.

As shown in FIG. 8, the container may be expanded by attaching accessories to one or more pins positioned at discrete locations adjacent to the lid. Referring to FIG. 9, a perspective view (900) of the container is provided illustrating the lid and expansion capability of the lid through an integrated bin. As shown, the lid (910) is in a closed position such that the container is enclosed. In one embodiment, one or more latches (920) extend from the lid (910) and are received by a corresponding holding element (922). In one embodiment, the latch (920) seals the lid (910) to the container, e.g. vacuum or air-tight seal. Similarly, in one embodiment, the latch (920) is comprised of a rubber or a material with similar properties that enables the latch to expand and contract.

The lid (910) is configured with a recess (912) sized to receive a bin (930). In one embodiment, recess (912) is shallow, so that the integrity of the lid (910) is not compromised. In one embodiment, the recess (912) is approximately 0.5 inches in depth. As described in detail below, the lid (910) may receive a bin (930) in an expanded form as a secondary container. Although the bin (930) is shown herein collapsed. Accordingly, the bin (930) requires sufficient structural integrity to support added weight.

Another embodiment includes a bin (930) integrated with the lid (910). The first position opens the bin, thus forming a secondary enclosure on top of the lid (910) for the storage of additional goods, equipment, and items. The second position collapses the bin (930) closed. The recess (912) is shown in receipt of a bin (930) in a collapsed orientation. At such time as the container is being transported either on the ground through rotation of the wheels or being lifted through the handles in the bottom wall, it is preferred, although not required, that the bin (930) be in a collapsed position. As shown, the lid (910) is configured with a plurality of pins with each pin positioned in an associated channel. More specifically, and as shown, pin (940) is positioned in channel (960) and pin (942) is positioned in channel (962). Each of these pins is configured similar to the pins in the front and side walls shown in FIG. 8. The pins (941), (943), (944), and (945) are each shown in receipt of a bin securing strap. More specifically, pin (945) is in receipt of strap (955), pin (944) is in receipt of strap (954), pin (941) is in receipt of strap (951), and pin (943) is in receipt of strap (953). The channels (961), (963), (964), and—(965) provide clearance to receive the associated strap, (951), (953), (954), and (955) respectively. In one embodiment, the strap employs hook and loop fasteners to securing the strap around the associated pin. By securing the straps of the bin to the respective pin, the bin (930) is secured to the container.

More specifically, and as shown, in the collapsed position, the bin (930) is received in the recess (912) so that the bin does not form an obstruction with respect to the container. At the same time, the lid is shown herein with at least two handles (914) and (916), although the quantity of handles should not be considered limiting. At such time as the latch(es) (920) is in a released position, e.g. not in communication with the associated container wall, and the bin (930) is secured to the lid, either of the handles (914) or (916) may be used to rotated the lid (910) and effectively open the container. For example, in one embodiment, a hinge (not shown) may be positioned on a wall opposite to the handle, so that lifting the lid view the handle would include rotation of the opposite wall around the hinge. As shown, the accessories are configured to be received by the holding pins attached to the walls of the container, and as such, the accessories do not communicate or interfere with movement of the lid (910). See FIG. 8 for an example of an accessory positioned in communication with a pin. Accordingly, the accessories may remain in communication with the respective wall pins at such time as the lid (910) is rotated.

Figure 10:
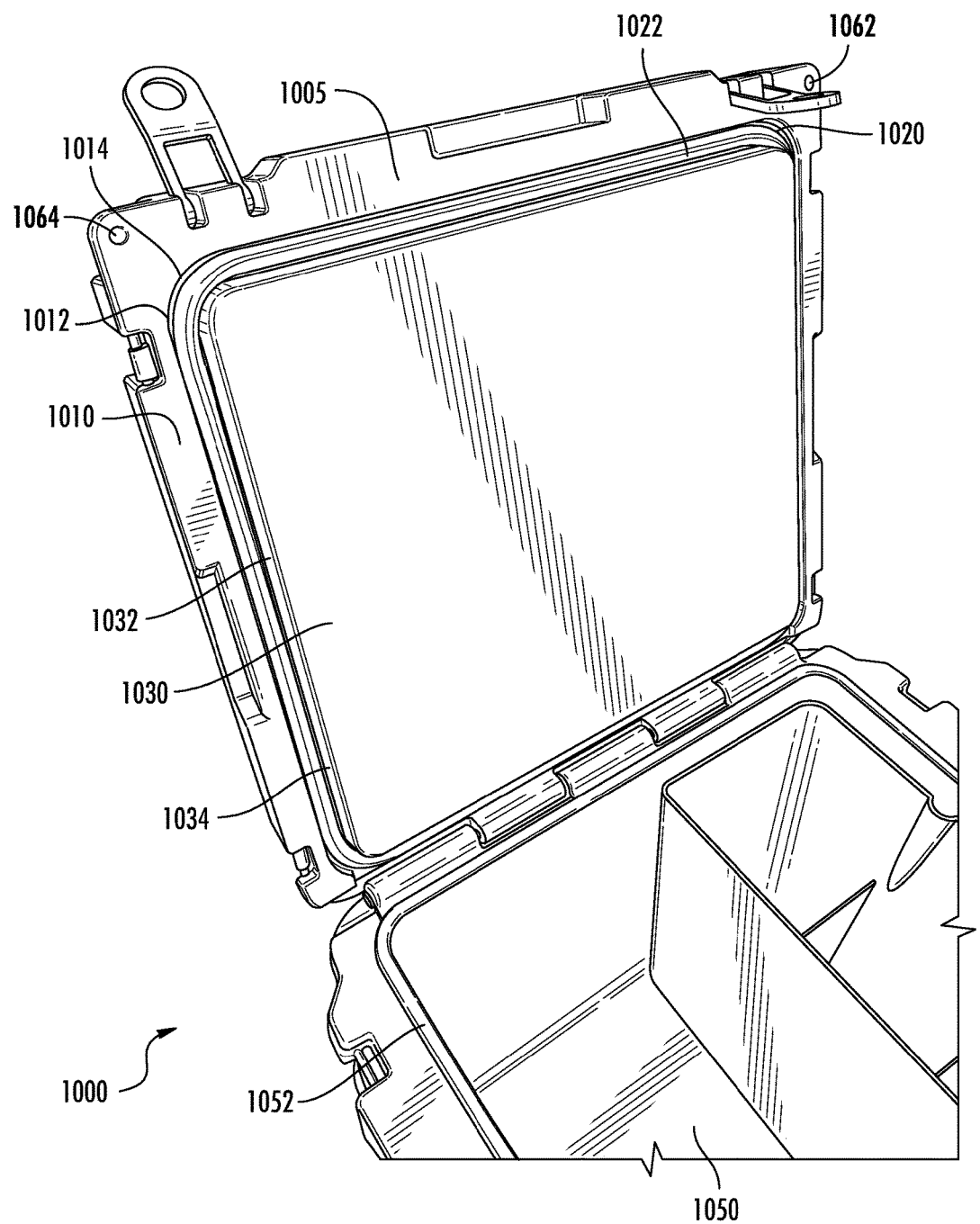
FIG. 10 depicts a perspective view of the container illustrating an interior surface of the lid.

Referring to FIG. 10, a diagram (1000) is provided illustrating a perspective view of the container illustrating an interior surface of the lid. As shown, the interior of the container lid (1005) is separated into multiple sections, including a first section (1010), a second section (1030), and a channel (1020) positioned between the first and second sections (1010) and (1030), respectively. The first section (1010) is shown having a first depth (1012) and an associated first perimeter (1014). Similarly, the second section (1030) is shown having a second depth (1032) and an associated second perimeter (1034). As shown, the second perimeter (1034) is positioned internal to the first perimeter (1014). The first depth (1012) and first perimeter (1014) are sized to be received by a proximally positioned interior compartment (1050) of the container. The channel (1020) is shown with a gasket (1022) positioned therein. The gasket (1022) is comprised of an insulating material, e.g. rubber, synthetic rubber, silicon, etc. which in one embodiment may also may a malleable material. The gasket (1022) functions to provide a seal between lid (1005) and an interior compartment (1050) of the container.

The lid (1005) is shown herein in a raised position with the interior compartment (1050) open and exposed. The interior compartment (1050) is shown with a perimeter liner (1052). In one embodiment, the perimeter liner (1052) has a uniform width. In one embodiment, the perimeter liner has a width less than the size of the channel (1020). The perimeter liner (1052) is sized to be received by the channel (1020). When the lid (1005) is lowered and received by the container, the perimeter liner (1052) is received in the channel (1020) and the gasket (1022) creates a seal between the lid (1005) and the interior compartment (1050). In one embodiment, the gasket (1022) forms a water tight seal between the lid (1005) and the interior compartment (1050). Accordingly, the channel (1020) with the embedded gasket (1022) function to seal the lid (1005) to the interior compartment (1050), thereby creating a sealed container.

In addition, as described in FIG. 1, the lid (1005) is shown with holes to receive a secondary element, such as a lock. As shown in this view, holes (1062) and (1064) are formed in the lid (1005). A corresponding and aligned hole is positioned in the cooler body (not shown in this view). The holes (1062) and (1064) are sized to receive a lock to secured the lid to the cooler body.

Figure 11:
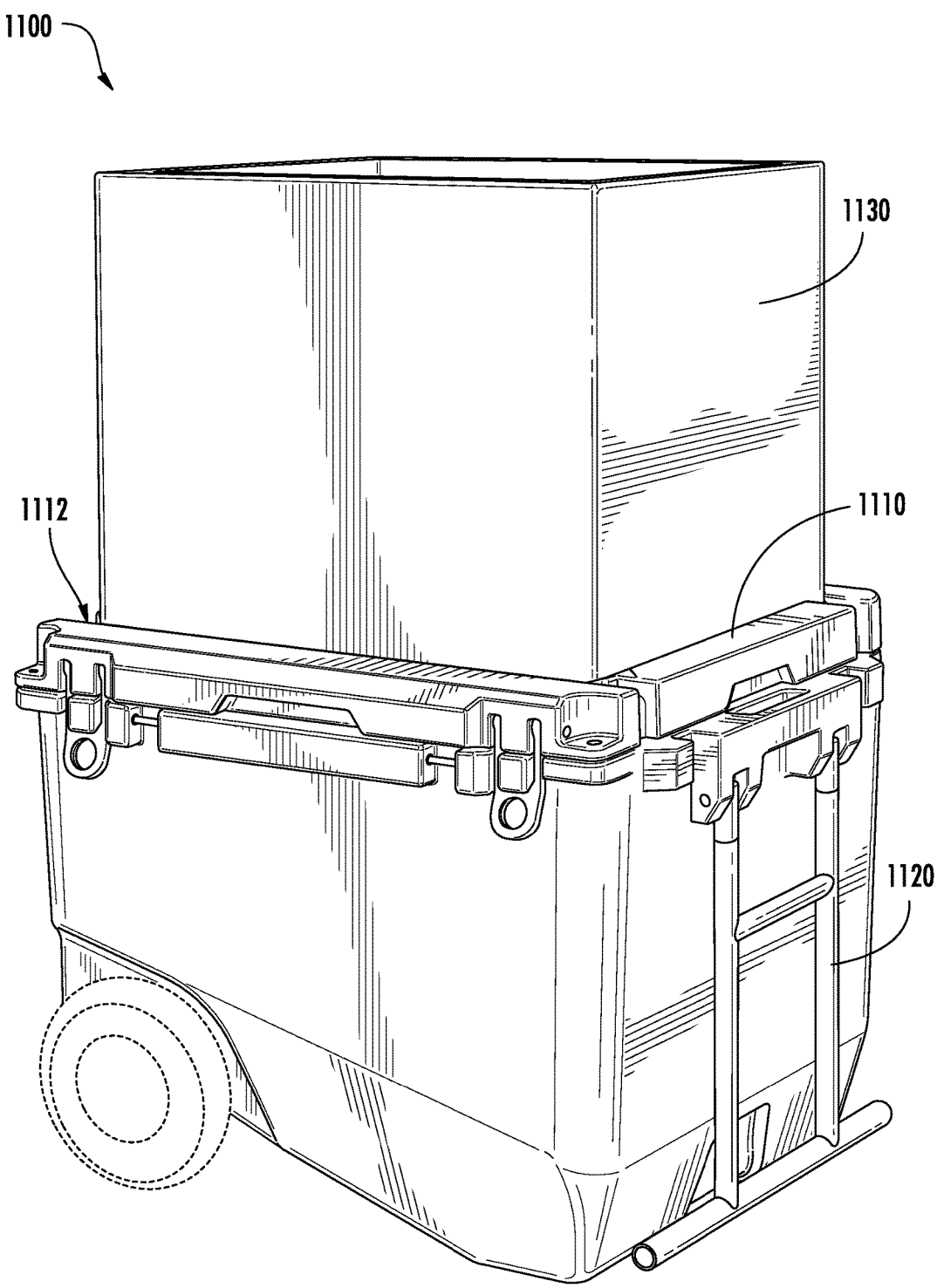
FIG. 11 depicts a perspective view of the container depicting the bin in an expanded state.

Referring to FIG. 11, a perspective view (1100) of the container is provided depicting the bin in an expanded state. As shown, the bin (1130) is in communication with the lid (1110). In the expanded state, the bin (1130) functions as a secondary container to store objects. Each lower corner of the expanded bin (1130) has a strap that is secured to a local pin. As shown, the expanded bin (1130) is positioned in the recess (1112) of the lid (1110). In one embodiment, when the container is in a stationary position, each lower corner of the expanded bin (1130) has a local strap attached to a local pin in the manner shown in FIG. 12. As shown herein, the bin (1130) is in an expanded state and functions to hold one or more secondary objects. In the expanded state, the bin (1130) remains positioned in the recess (1112), and secured to the lid (1110) via the pins and associated straps, as shown and described below in FIG. 12. Expansion of the bin (1130) effectively increases the storage capacity of the container. Accordingly, expansion of the bin converts the bin and associated container into a wagon with secondary storage space.

Figure 12:
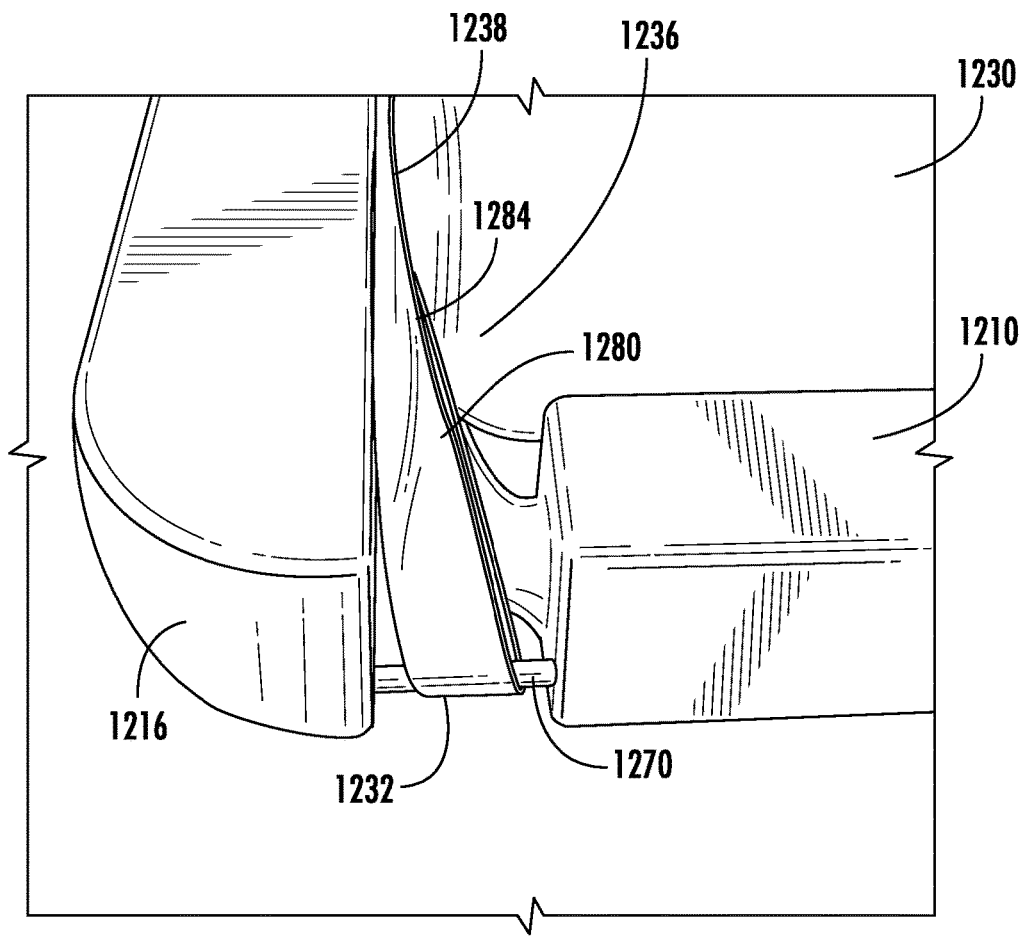
FIG. 12 depicts a side view of the attachment mechanism for securing the bin to the lid.

Referring to FIG. 12, a side view (1200) of the attachment mechanism for securing the bin to the lid is provided. The view focuses on a corner (1216) of the lid (1210) and a proximally positioned corner (1236) of the bin (1230). A pin (1270) is positioned on a perimeter of the lid (1210). A strap (1280) is secured to the bin (1230) at (1232). The strap (1280) is shown secured to the lid (1210), and more specifically to the pin (1270). The strap (1280) extends from the attachment point at (1238), wraps around the pin (1270), and is secured to itself at (1284). The strap (1280) is wrapped around the pin (1270) to secure, or otherwise hold the corner (1236) of the bin (1230) to the lid (1210), e.g. positioned in a lower corner (1216). The attachment shown in FIG. 12 is replicated across each lower corner of the expanded bin (1230), with a local strap attached to a local pin in the manner shown, e.g. each strap (1280) is separately attached to the local pin (1270). Similarly, in one embodiment, each of the straps may be separately released from the local positioned pin. In one embodiment, the strap (1280) includes hook and loop fasteners so that as a proximal end of the strap is wrapped around the local pin, the proximal end of the strap may be secured to a distal end of the strap. As shown herein, in the expanded state, the bin (1230) remains positioned in the recess, and secured to the lid via the pins and associated straps, as described above. Expansion of the bin (1230) effectively increases the storage capacity of the container. Accordingly, expansion of the bin converts the bin and associated container into a wagon with secondary storage space.

Figure 13:
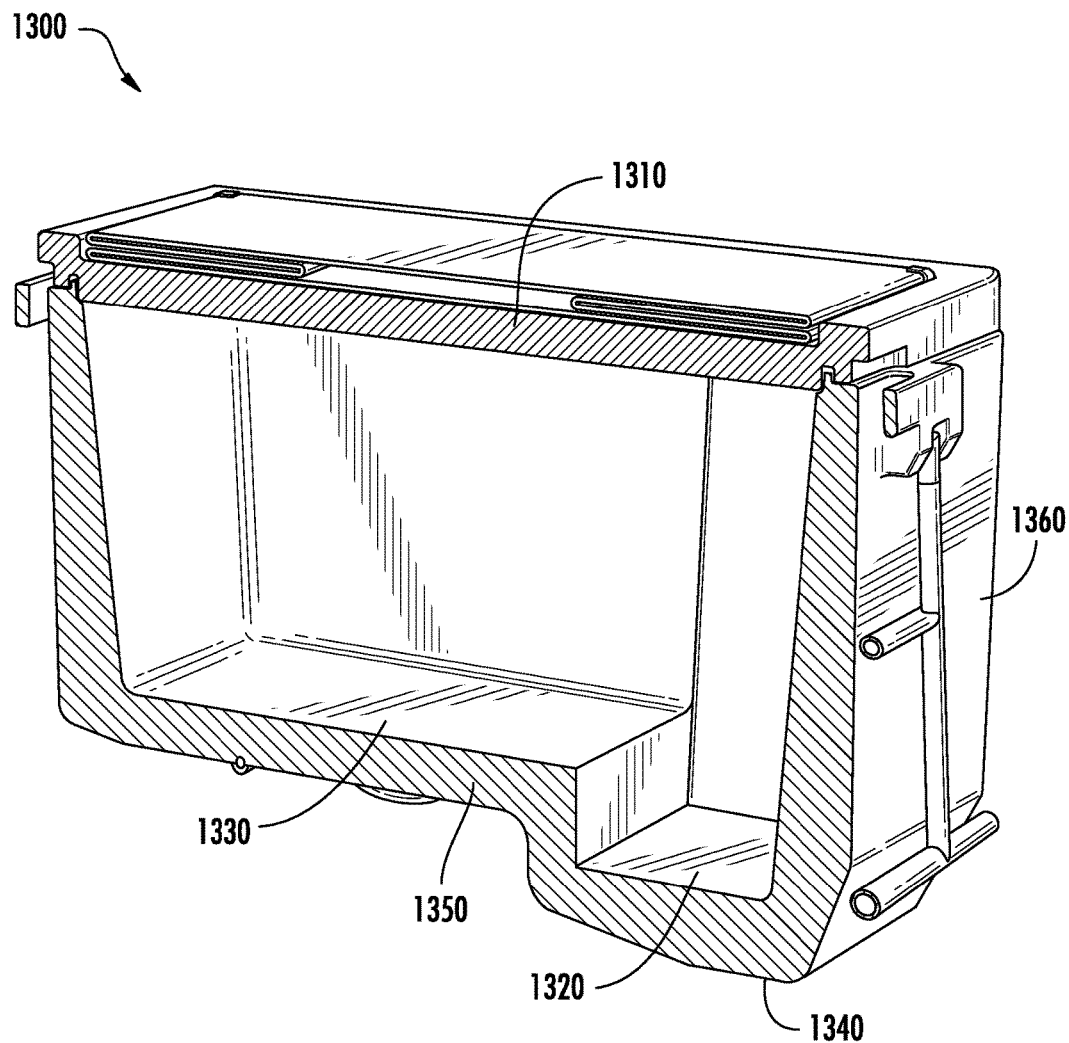
FIG. 13 depicts a cross section of the interior compartment of the container.

FIGS. 1-12 illustrate exterior aspects of the container. Referring to FIG. 13, a cross section (1300) of the interior compartment of the container is shown. Within the enclosure (1310) of the container, certain embodiments may include two floors, a first floor (1320) and second floor (1330); both floors being substantially parallel to the base (1340). The first floor (1320) is directly above the base (1340) and is lower with respect to the second floor (1330) thereby providing more depth within the enclosure (1310) for larger goods and items. The second floor (1330) is directly above the third wall (1350) and consequentially higher with respect to the first floor (1320). A removable separation (shown in FIG. 14) may be further included for separating the goods and/or items resting on the first floor (1320) from the goods and/or items resting on the second floor (1330). The separation wall is ideally substantially parallel to the front wall (1360) and/or substantially perpendicular to the first (1320) and second (1330) floors.

Figure 14:
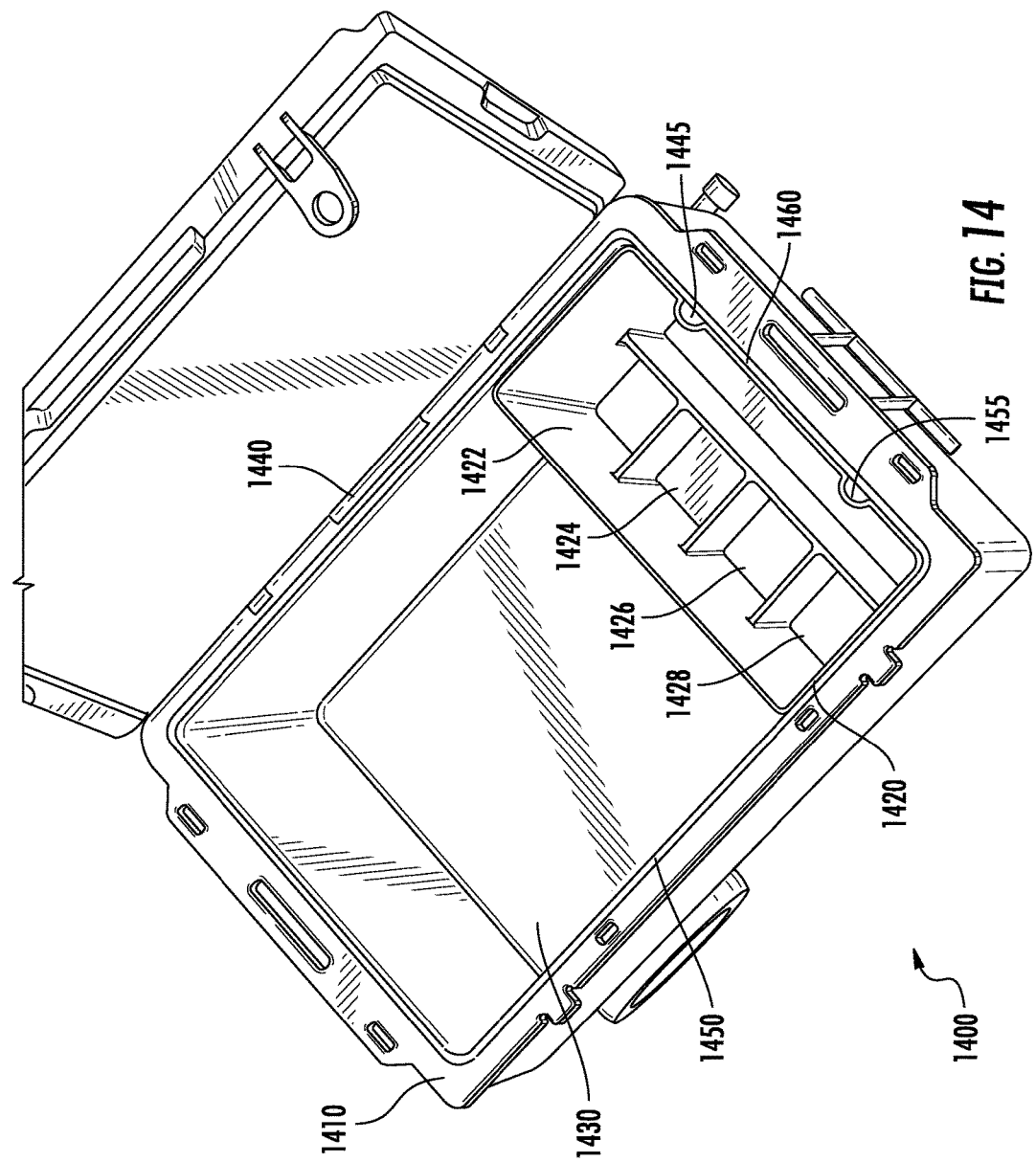
FIG. 14 depicts a top view of the container with the lid open, exposing the enclosure within as well as the separator.

Referring to FIG. 14, a top view (1400) of the interior of the compartment is provided. The top view illustrates the interior, or enclosure of the container (1410). A removable separator (1420), also referred to as a dry bin, is shown positioned within the enclosure. The separator (1420) fits snugly between two interior side walls (1440) and (1450) and occupies the area directly above a first floor (1320). As shown in FIG. 14, the separator (1420) may have one or more compartments (1422), (1424), (1426), (1428), and (1430) for organized storage of goods. In one embodiment, the separator (1420) allows for separate storage of wet items and dry items. As such, the separator (1420) allows dry items to be stored within the vicinity of wet items without exposure to moisture from the wet items. For example, ice cubes may be kept in compartment (1430) while fresh fruit may be kept in compartments (1422), (1424), (1426), and (1428). In this example, melting ice from the ice cubes will not wet the fresh fruit in the other compartments. In another embodiment, the separator (1420) allows for the separate storage of hot items and cold items. In this manner, the separator (1420) allows for close storage of items with different temperatures while keeping thermal transfer between them at a minimum. In one embodiment, the separator (1420) is a dry bin that is impermeable. For example, ice and or water in the compartment (1430) do not enter the separator (1420). In one embodiment, the separator is configured to withstand pressure from water and or products in the compartment. The separator (1420) is removable so as to allow for the storage of larger items when needed. In the illustrated embodiment, the separator (1420) is removable by sliding the separator (1420) upwards along grooves (1445) and (1455) of the interior side wall (1460).

Figure 15:
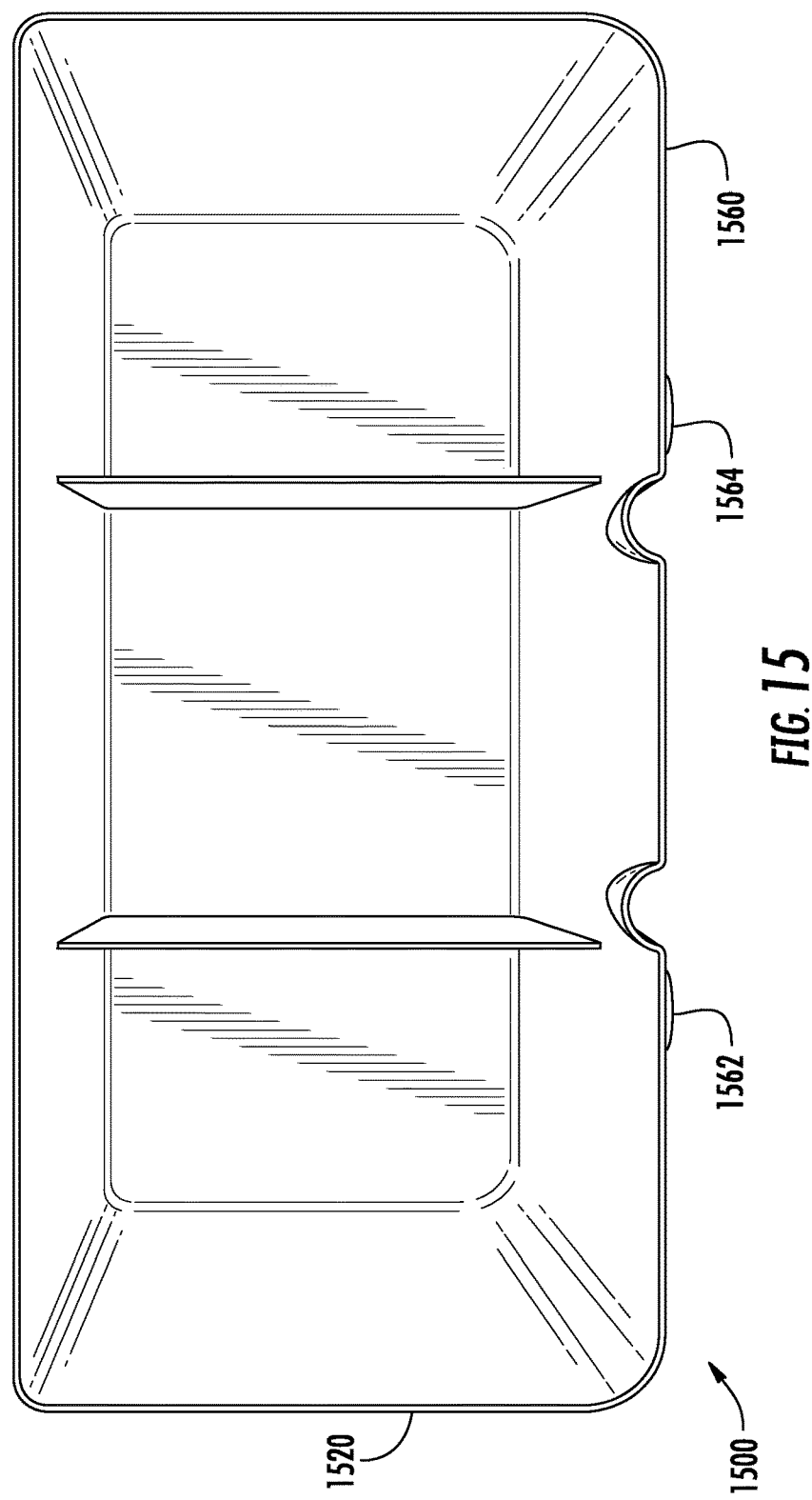
FIG. 15 depicts a top view of the separator.

Referring to FIG. 15, a top view (1500) of the separator (1120) is provided. As shown, an exterior wall (1560) of the separator (1520) is provided with attachment elements (1562) and (1564) to secure the separator (1520) to an interior wall of the container. In one embodiment, the attachment elements (1562) and (1564) are molded hook and look fasteners that are received by corresponding hook and look fasteners positioned on an interior wall of the container. The attachment elements mitigate movement of the separator (1520) within the container. In one embodiment, the attachment element is a screw (not shown) with a corresponding lip (not shown). For example, the screw may be embedded or attached to the interior wall of the container and the lip may be attached to an exterior wall of the separator (1520). As the separator (1520) is placed in the container, the lip receives the screw and the functions to hold the separator (1520) in position. Similarly, in one embodiment, the screw is attached to the interior wall of the container and the lip is attached to an exterior wall of the separator (1520), with the attachment being the inverse, but continuing to hold the separator (1520) to a position within the container. During transport it is understood that the separator (1520) may be subject to movement, stress, and/or strain. Securing the separator (1520) to the interior wall(s) of the container mitigates movement and/or damage to the separator (1520), thereby protecting and securing product stored within the separator.

Figure 16:
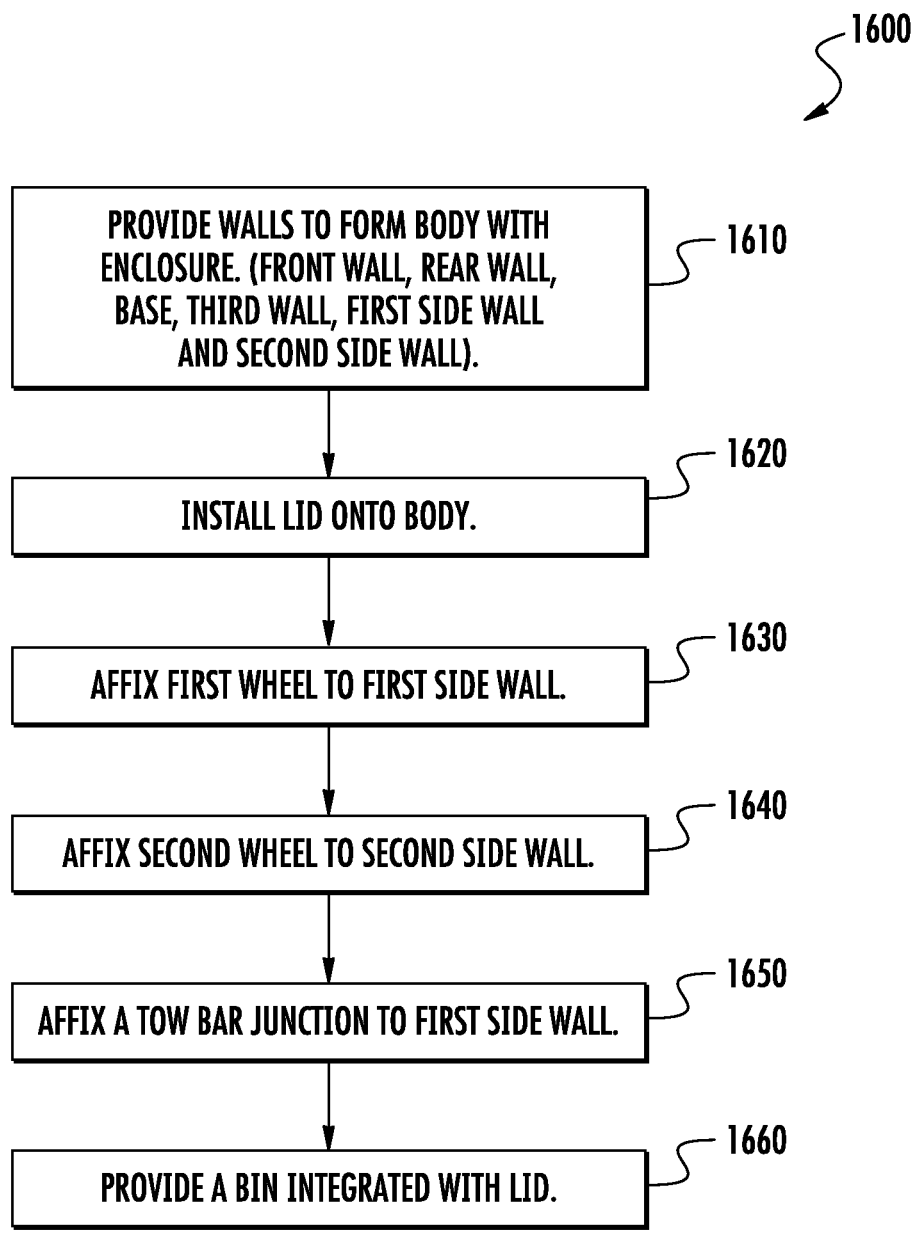
FIG. 16 depicts a flow chart illustrating a method of creating and utilizing a portable cooler.

Referring to FIG. 16, a flow chart (1600) is provided illustrating a method of creating and utilizing a portable cooler is provided. A body is provided (1610) formed of a plurality of walls, and the walls forming an enclosure within the body. The walls comprise a front wall, rear wall, first side wall, second side wall, a base, and a third wall. The height of the front wall is greater than that of the rear wall. The base is positioned at the lower end of the front wall and functions as a resting surface for when the cooler is resting on terrain. The third wall extends from the base to the lower end of the rear wall; the differential between the heights of the first wall and the second wall causes the third wall to have a gradient with respect to the base. A lid is installed (1620) in communication with the body and operable to provide the user access to the enclosure. A first wheel and a second wheel are affixed in rotatable communication with a first side wall (1630) and second side wall (1640), respectively. The first wheel and the second wheel share an axis of rotation. In another embodiment, the wheels are not connected by an axle and are therefore able to independently rotate with respect to one another. In a further embodiment, the axis of rotation of both wheels is substantially close to the third wall and the radii of the wheels is large, i.e. at least two inches, thereby increasing the ground clearance of the cooler during transport.

Another embodiment of the method comprises affixing a junction (1650) to a first side wall and/or second side wall. The junction is configured to receive a tow bar for towing the cooler with a vehicle such as a bicycle, tricycle, scooter, or similar. Also, the junction may be affixed in an orientation such that when the tow bar is installed and a vehicle is used to tow the cooler, the base is lifted off the ground and the third wall orientated horizontal with respect to the ground. This orientation may be parallel to the third wall or otherwise, depending on the configuration of the tow bar.

In yet another embodiment, the method may further comprise providing a bin integrated with the lid (1660). The bin may have a first position and a second position. The first position forms a secondary enclosure within which additional goods, equipment, and other items may be stored. The second position folds the bin closed. By folding closed, the bin may be stored away in a recess of the lid. The bin may be attached to the lid for security with removable attachments. The removable attachments may be in the form of buttons, tie-downs, tie-wraps, hook and loop attachments such as Velcro®, etc.

In this disclosure, the terms "third wall" and "first section of the bottom wall" are used interchangeably to describe the same structural feature. Likewise, the term "base" and "second section of the bottom wall" are also used interchangeably in this disclosure.

The present embodiments may be embodied in other specific forms without departing from its spirit or essential characteristics. The described embodiments are to be considered in all respects only as illustrative and not restrictive. The scope of the embodiments, is, therefore, indicated by the appended claims rather than by the foregoing description. All changes which come within the meaning and range of equivalency of the claims are to be embraced within their scope. Accordingly, the scope of protection of the embodiments is limited only by the claims and their equivalents.

What is claimed is:

1. An apparatus, comprising:
   a body comprised of a plurality of walls and forming an enclosure;
   a lid in communication with the body and operable to provide access to the enclosure;
   a first wall and an oppositely disposed second wall, the first wall having a first height and the second wall having a second height, the first height being greater than the second height;
   a base and a third wall extending from the base to the second wall, the third wall having a first gradient with respect to the base;
   a junction affixed to a first side wall, the first side wall position between the first wall and the second wall, the junction having a second gradient with respect to the base, wherein the first and second gradients are relatively parallel; and
   a first wheel positioned adjacent to a first side wall and a second wheel positioned adjacent to a second side wall.

2. The apparatus of claim 1, wherein the first wall is relatively perpendicular to the first side and second side walls, a recess formed in the first wall, the recess sized to receive a handle in a rest position relatively flush with the first wall.

3. The apparatus of claim 1, wherein the junction is configured to receive a tow bar bracket.

4. The apparatus of claim 3, further comprising an aperture positioned in the bracket, the aperture sized to secure a tow bar to the body.

5. The apparatus of claim 1, further comprising at least two attachment pins positioned in one of the walls configured to receive a removable accessory.

6. The apparatus of claim 5, further comprising the accessory having a receiver configured to receive one of the attachment pins.

7. The apparatus of claim 6, further comprising the two attachment pins position having a uniform spacing on at least one wall, and the accessory having two receivers separated by the uniform spacing and positioned to receive the attachment pins.

8. The apparatus of claim 1, further comprising a bin integrated with the lid, the bin having a first position and a second position, the first position forming a secondary enclosure and the second position being an absence of the secondary enclosure.

9. The apparatus of claim 8, further comprising a recess in the lid, wherein when bin is in the second position, the bin rests within the recess.

10. The apparatus of claim 8, further comprising at least one attachment pin positioned along a perimeter of the lid, and the bin having an attachment element configured to be received by the pin.

11. The apparatus of claim 1, further comprising at least one latch with a proximal end attached to the lid and a distal end oppositely disposed, the latch to secure the lid to the first side wall, including an aperture in the latch to receive a holding element positioned in the first side wall.

12. The apparatus of claim 11, further comprising an aperture integrated into the latch and manipulation of the latch releasing of the latch from the first side wall.

13. The apparatus of claim 1, wherein the axis of rotation of the first and second wheel is substantially proximal to the third wall and the radii of the first and second wheels are at least two inches.

14. The apparatus of claim 1, further comprising:
   a first floor positioned within the enclosure and substantially parallel to the base;
   a second floor positioned within the enclosure and substantially parallel to the base and in a different plane than the first floor; and
   a removable separation wall intermediately disposed between the first floor and the second floor.

15. The apparatus of claim 12, wherein the separation wall is substantially parallel to the first wall.

16. The apparatus of claim 1, further comprising an impermeable bin adapted to be received within the enclosure.

17. The apparatus of claim 16, further comprising a first attachment element secured to an exterior surface of the impermeable bin, and a corresponding second attachment element secured to an interior wall of the enclosure, wherein attachment of the first and second attachment elements secures a position of the bin within the enclosure.

18. The apparatus of claim 1, wherein the lid includes an interior surface with a channel and the enclosure includes a perimeter sized to receive the channel, and further comprising a gasket positioned in the channel to seal the lid to the container.

19. The apparatus of claim 1, further comprising a handle in communication with the body, the handle including two relatively parallel bars and an exterior transverse bar having a first grip element and a second grip element extending exterior to the two relatively parallel bars.

20. The apparatus of claim 19, wherein the handle further comprising an interior transverse bar parallel to the exterior transverse bar, the interior transverse bar to support a position of the two relatively parallel bars.

21. The apparatus of claim 19, further comprising a first grip surface in communication with the first grip element and a second grip surface in communication with the second grip element.

22. The apparatus of claim 19, wherein the position of the first and second grip elements distributes weight of the cooler across two points of contact.

23. The apparatus of claim 19, further comprising a raised position of the handle distal from the first wall, and the position of the first and second grip elements with respect to the first wall to mitigate an obstruction with the body.

24. A method of creating an apparatus, the method comprising:
- providing a body formed of a plurality of walls, the walls forming an enclosure, the plurality of walls comprising:
  - a first wall with a first height and an oppositely disposed second wall with a second height, the first height being greater than the second height; and
  - a base and a third wall extending from the base to the second wall, the third wall having a first gradient with respect to the base;
- affixing a junction to a first side wall, the first side wall positioned between the first wall and the second wall, wherein the junction has a second gradient with respect to the base, the first and second gradients being relatively parallel;
- installing a lid in communication with the body, the lid being operable to provide access to the enclosure; and
- affixing a first wheel in rotatable communication to a first side wall and a second wheel in rotatable communication to a second side wall, wherein the first wheel and the second wheel share an axis of rotation.

25. The method of claim 24, wherein the junction is configured to receive a tow bar.

26. The method of claim 24, further comprising providing a bin integrated with the lid, the bin having a first position and a second position, the first position forming a secondary enclosure and the second position being an absence of the secondary enclosure.

* * * * *